United States Patent
Mourlam et al.

(10) Patent No.: US 12,485,543 B2
(45) Date of Patent: Dec. 2, 2025

(54) COOPERATIVE HIGH-CAPACITY AND HIGH-DEXTERITY MANIPULATORS

(71) Applicant: Altec Industries, Inc., Birmingham, AL (US)

(72) Inventors: Timothy J. Mourlam, Shawnee, KS (US); David Lindquist, Cameron, MO (US); William Naber, Saint Joseph, MO (US); Jonathan Westin Sykes, Gower, MO (US)

(73) Assignee: Altec Industries, Inc., Birmingham, AL (US)

( * ) Notice: Subject to any disclaimer, the term of this patent is extended or adjusted under 35 U.S.C. 154(b) by 123 days.

(21) Appl. No.: 18/212,415

(22) Filed: Jun. 21, 2023

(65) Prior Publication Data

US 2024/0033925 A1 Feb. 1, 2024

Related U.S. Application Data

(63) Continuation of application No. 17/875,743, filed on Jul. 28, 2022, now Pat. No. 11,717,969.

(51) Int. Cl.
*B25J 9/16* (2006.01)
*B25J 9/00* (2006.01)
*H02G 1/02* (2006.01)

(52) U.S. Cl.
CPC .......... *B25J 9/1682* (2013.01); *B25J 9/1669* (2013.01); *B25J 9/1679* (2013.01); *B25J 9/1689* (2013.01); *B25J 9/0084* (2013.01); *H02G 1/02* (2013.01)

(58) Field of Classification Search
CPC ........ B25J 9/0087; B25J 9/0084; B25J 9/162; B25J 9/1669; B25J 9/1689; B25J 9/1697; B25J 9/1682; H02G 1/02; H02G 1/04
See application file for complete search history.

(56) References Cited

U.S. PATENT DOCUMENTS

| 1,050,004 A | 1/1913 | Jeremiah |
| 1,676,584 A | 7/1928 | Tideman |

(Continued)

FOREIGN PATENT DOCUMENTS

| CN | 113001569 A | * | 6/2021 |
| CN | 113902990 A | | 1/2022 |

(Continued)

OTHER PUBLICATIONS

Aracil, et al., "Teleoperated system for live power lines maintenance," Dec. 1995, Proceedings of SPIE—The International Society for Optical Engineering (Year: 1995).*

(Continued)

*Primary Examiner* — Spencer D Patton
(74) *Attorney, Agent, or Firm* — Erise IP, P.A.

(57) ABSTRACT

Systems and methods for cooperative aerial robotics for working in an aerial work environment. In some embodiments, a robot system may comprise a robot unit comprising high-dexterity manipulators for performing high-dexterity work. The robot system may further comprise a high-capacity manipulator for performing high-capacity work. The robot system may comprise a plurality of sensors for detecting the work environment and providing a representative work environment to an operator and/or a controller for operation of the robot system to complete the aerial work. The robot system may be remotely operated by an operator, automatically, and/or autonomously. The robot system may be disposed at the top of a boom of an aerial device for performing work in high-voltage areas.

20 Claims, 10 Drawing Sheets

(56) References Cited

U.S. PATENT DOCUMENTS

| | | |
|---|---|---|
| 1,966,989 A | 7/1934 | Bernard |
| 2,662,730 A | 12/1953 | Crawford |
| 2,786,092 A | 3/1957 | Gage |
| 4,937,759 A | 6/1990 | Vold |
| 5,076,449 A | 12/1991 | Clutter |
| 5,105,367 A | 4/1992 | Tsuchihashi et al. |
| 5,215,202 A | 6/1993 | Fujimoto |
| 5,286,159 A | 2/1994 | Honma |
| 5,640,876 A | 6/1997 | Erwin |
| 5,782,440 A | 7/1998 | Ozga et al. |
| 6,325,749 B1 * | 12/2001 | Inokuchi .......... H02G 1/02 182/2.11 |
| 6,527,405 B2 | 3/2003 | Hsieh |
| 9,203,219 B2 | 12/2015 | Devine et al. |
| 9,707,680 B1 | 7/2017 | Jules et al. |
| 9,727,053 B2 | 8/2017 | Ito |
| 10,105,853 B1 | 10/2018 | Hwang et al. |
| 10,589,433 B2 | 3/2020 | Nahwi et al. |
| 10,626,632 B2 | 4/2020 | Sauber et al. |
| 11,087,540 B2 | 8/2021 | Ernst et al. |
| 11,660,750 B1 | 5/2023 | Sykes et al. |
| 11,689,008 B1 | 6/2023 | Nichols et al. |
| 11,697,209 B1 | 7/2023 | Mourlam et al. |
| 11,717,969 B1 | 8/2023 | Mourlam et al. |
| 11,742,108 B1 | 8/2023 | Naber et al. |
| 11,749,978 B1 | 9/2023 | Lindquist et al. |
| 11,794,359 B1 | 10/2023 | Sykes et al. |
| 11,839,962 B1 | 12/2023 | Nichols |
| 2001/0055525 A1 | 12/2001 | Inokuchi et al. |
| 2002/0179559 A1 | 12/2002 | Hashiguchi et al. |
| 2003/0029215 A1 | 2/2003 | Latour |
| 2003/0174286 A1 | 9/2003 | Trumbull |
| 2004/0182235 A1 | 9/2004 | Hart |
| 2006/0045294 A1 | 3/2006 | Smyth et al. |
| 2007/0070072 A1 | 3/2007 | Templeman |
| 2007/0124024 A1 | 5/2007 | Okamoto et al. |
| 2007/0192910 A1 | 8/2007 | Vu et al. |
| 2007/0291128 A1 | 12/2007 | Wang et al. |
| 2008/0188986 A1 | 8/2008 | Hoppe |
| 2009/0088773 A1 | 4/2009 | Zhao et al. |
| 2009/0088897 A1 | 4/2009 | Zhao et al. |
| 2011/0036605 A1 | 2/2011 | Leong et al. |
| 2011/0245844 A1 | 10/2011 | Jinno |
| 2011/0256995 A1 | 10/2011 | Takazakura et al. |
| 2013/0014852 A1 | 1/2013 | Hayden et al. |
| 2013/0313042 A1 | 11/2013 | Freeman et al. |
| 2014/0094968 A1 | 4/2014 | Taylor et al. |
| 2015/0015708 A1 | 1/2015 | Collett et al. |
| 2015/0044009 A1 | 2/2015 | Yang et al. |
| 2016/0239080 A1 | 8/2016 | Marcolina et al. |
| 2017/0124398 A1 | 5/2017 | Birkbeck et al. |
| 2017/0289445 A1 | 10/2017 | Kumar et al. |
| 2017/0334067 A1 * | 11/2017 | Swarup .......... B25J 19/021 |
| 2017/0340969 A1 | 11/2017 | Lim et al. |
| 2018/0011681 A1 | 1/2018 | Kada |
| 2018/0348861 A1 | 12/2018 | Uscinski et al. |
| 2019/0124294 A1 | 4/2019 | Ahn et al. |
| 2019/0125462 A1 | 5/2019 | Peine et al. |
| 2019/0176334 A1 | 6/2019 | Zhou et al. |
| 2019/0201136 A1 | 7/2019 | Shelton, IV et al. |
| 2019/0222004 A1 | 7/2019 | Turnbull |
| 2019/0256335 A1 | 8/2019 | Araki |
| 2019/0257097 A1 | 8/2019 | Kawai et al. |
| 2019/0321971 A1 * | 10/2019 | Bosworth .......... B25J 15/0028 |
| 2020/0122321 A1 | 4/2020 | Khansari Zadeh et al. |
| 2020/0302207 A1 | 9/2020 | Perkins et al. |
| 2021/0001483 A1 | 1/2021 | Milenkovic |
| 2021/0020337 A1 | 1/2021 | Ciapala et al. |
| 2021/0069894 A1 | 3/2021 | Rod et al. |
| 2021/0084278 A1 | 3/2021 | Harviainen et al. |
| 2021/0106342 A1 | 4/2021 | Blackwell |
| 2021/0252714 A1 | 8/2021 | Hayashi et al. |
| 2021/0269291 A1 | 9/2021 | Callaghan et al. |
| 2021/0273424 A1 | 9/2021 | Harvey et al. |
| 2021/0282871 A1 | 9/2021 | Prior et al. |
| 2021/0305790 A1 | 9/2021 | O'Connell et al. |
| 2021/0315590 A1 | 10/2021 | Chappuis et al. |
| 2021/0370509 A1 | 12/2021 | Pivac |
| 2022/0032476 A1 | 2/2022 | Robertson |
| 2022/0123534 A1 | 4/2022 | Kwon |
| 2022/0138612 A1 | 5/2022 | Vengertsev et al. |
| 2022/0203562 A1 | 6/2022 | Brown et al. |
| 2022/0212340 A1 | 7/2022 | Hasegawa et al. |
| 2022/0241975 A1 | 8/2022 | Tan et al. |
| 2022/0266449 A1 | 8/2022 | Hasegawa et al. |
| 2022/0287676 A1 | 9/2022 | Steines et al. |
| 2022/0288669 A1 | 9/2022 | Goodall et al. |
| 2022/0383531 A1 | 12/2022 | Santini et al. |
| 2023/0046644 A1 | 2/2023 | Themelis |
| 2023/0157525 A1 | 5/2023 | Hunter et al. |
| 2023/0200920 A1 | 6/2023 | Mittman |
| 2023/0270321 A1 | 8/2023 | Breton et al. |
| 2023/0311296 A1 | 10/2023 | Murray |
| 2024/0012238 A1 | 1/2024 | Lin et al. |
| 2024/0033916 A1 | 2/2024 | Sykes et al. |
| 2024/0033928 A1 | 2/2024 | Mourlam et al. |
| 2024/0038413 A1 | 2/2024 | Naber et al. |
| 2024/0039254 A1 | 2/2024 | Lindquist et al. |
| 2024/0058935 A1 | 2/2024 | Nichols |
| 2024/0208066 A1 | 6/2024 | Sykes et al. |
| 2025/0131588 A1 | 4/2025 | Takemoto |

FOREIGN PATENT DOCUMENTS

| | | |
|---|---|---|
| JP | 6840052 | 3/2021 |
| WO | 9532078 A1 | 11/1995 |
| WO | 2020203793 A1 | 10/2020 |

OTHER PUBLICATIONS

U.S. Appl. No. 18/368,155 Notice of Allowance issued Oct. 29, 2024.

European Patent Application 23757405.8 Communication pursuant to Rules 161(1) and 162 EPC issued Mar. 7, 2025.

PCT Patent Application PCT/US2023/028564 International Preliminary Report on Patentability Search Report and Written Opinion of the International Searching Authority issued Jan. 28, 2025.

U.S. Appl. No. 18/135,941 Non-Final Office Action issued Aug. 16, 2024.

U.S. Appl. No. 18/197,438 Notice of Allowance issued Aug. 5, 2024.

U.S. Appl. No. 18/197,438 Corrected Notice of Allowance issued Aug. 28, 2024.

PCT Patent Application PCT/US2023/028564 International Search Report and Written Opinion of the International Searching Authority, issued Nov. 22, 2023.

U.S. Appl. No. 17/875,990, Notice of Allowance dated Apr. 21, 2023.

U.S. Appl. No. 17/875,674, Final Office Action dated Feb. 15, 2023.

U.S. Appl. No. 17/875,674, Non-Final Office Action dated Oct. 13, 2022.

U.S. Appl. No. 17/875,674, Notice of Allowance and Interview Summary dated Jun. 16, 2023.

U.S. Appl. No. 17/875,743, Final Office Action dated Jan. 10, 2023.

U.S. Appl. No. 17/875,743, Non-Final Office Action dated Sep. 22, 2022.

U.S. Appl. No. 17/875,743, Notice of Allowance and Interview Summary dated Mar. 27, 2023.

U.S. Appl. No. 17/875,796, Non-Final Office Action dated Apr. 5, 2023.

U.S. Appl. No. 17/875,796, Notice of Allowance dated Aug. 2, 2023.

U.S. Appl. No. 17/875,990, Non-Final Office Action dated Feb. 9, 2023.

U.S. Appl. No. 18/368,155, Non-Final Office Action issued Jun. 21, 2024.

U.S. Appl. No. 18/385,545 Notice of Allowance issued Jul. 15, 2024.

(56) References Cited

OTHER PUBLICATIONS

U.S. Appl. No. 18/224,278 Non-Final Office Action issued Sep. 5, 2024.
U.S. Appl. No. 18/643,767 Non-Final Office Action issued Sep. 19, 2025.
U.S. Appl. No. 18/914,695 Non-Final Office Action issued Oct. 24, 2025.

* cited by examiner

COOPERATIVE HIGH-CAPACITY AND HIGH-DEXTERITY MANIPULATORS

RELATED APPLICATIONS

This patent application is a continuation application claiming priority benefit, with regard to all common subject matter, of commonly assigned and U.S. patent application Ser. No. 17/875,743, filed Jul. 28, 2022, and entitled "COOPERATIVE HIGH-CAPACITY AND HIGH-DEXTERITY MANIPULATORS." The above-referenced patent application is hereby incorporated by reference in its entirety into the present application.

BACKGROUND

1. Field

Embodiments of the disclosure relate to high-capacity and high dexterity robotic manipulators. More specifically, embodiments of the disclosure relate to high-capacity and high dexterity robotic manipulators for use in aerial high-voltage line work.

2. Related Art

Typically, several workers are required to be elevated by a boom and bucket of an aerial device to perform work on aerial lines (e.g., power lines, telecommunication lines, tension lines, and the like). The workers may be in close proximity to high electrical energy lines. Furthermore, multiple workers and multiple aerial devices may need to be utilized to complete the required jobs. To perform the jobs heavy objects may need to be removed or replaced. In these scenarios utility vehicles comprising booms with hooks and crane attachments may be utilized to attach to, and transport, the heavy objects. Furthermore, the workers may perform high-dexterity work such as manipulating fasteners, installing insulators, coupling cables by attachments, removing and installing tie wire, and the like. These operations may be performed by multiple workers in a single utility platform or multiple workers in several utility platforms. This work can be labor intensive and positions the workers in a high-voltage environment with multiple workers operating machinery at the aerial location and from the ground.

Accordingly, a need exists for controllable robots to take the place of the workers. Further, what is needed is cooperation between a plurality of robots to perform the work of a plurality of individuals performing both high-capacity and high-dexterity work.

SUMMARY

Embodiments of the invention solve the above-mentioned problems by providing systems and methods for cooperative work between a plurality of robots working on aerial lines (e.g., power lines and telecommunication lines). In some embodiments, a robot unit comprising high-dexterity manipulators and a plurality of sensors may be utilized to take the place of aerial line workers to perform high-dexterity tasks like, for example, tie wire removal, removal of fasteners, damage repair, maintenance, and replacement. Furthermore, high-capacity tasks such as lifting and replacing transformers, conductors, cross members, and the like may be performed or aided by high-capacity manipulators working in cooperation with the robot unit. The robots may be remotely controlled by operators or may work automatically or completely autonomously.

A first embodiment is directed to a system for cooperative robotic aerial line work in an aerial work environment. The system comprises a robot unit disposed on a boom tip of an aerial device. The robot unit comprises at least one first manipulator, a tool for performing aerial line work and coupled to the at least one first manipulator, wherein the at least one first manipulator and the tool are configured to perform high-dexterity work. The system further comprises at least one second manipulator proximate the robot unit and configured for performing high-capacity work, and a platform supporting the robot unit and the at least one second manipulator on the boom tip.

A second embodiment is directed to a system for cooperative robotic aerial line work in an aerial work environment. The system comprises a robot unit disposed on a boom tip of an aerial device, the robot unit comprising at least one first manipulator, a tool for performing aerial line work and coupled to the at least one first manipulator, wherein the at least one first manipulator and the tool are configured to perform high-dexterity work; and at least one second manipulator proximate the robot unit and configured for performing high-capacity work. The system further comprises one or more cameras disposed on the boom tip and configured to capture images of the aerial work environment, a control unit in communication with the robot unit and the at least one second manipulator. The control unit comprises a head-mounted display for displaying the images captured by the one or more cameras; and hand controls configured to receive input by an operator for controlling the robot unit and the at least one second manipulator.

A third embodiment in combination with the first embodiment or the second embodiment is directed to one or more cameras disposed on the boom tip and configured to capture images of the aerial work environment, a control unit in communication with the robot unit and the at least one second manipulator, the control unit comprising a head-mounted display for displaying the images captured by the one or more cameras, and hand controls configured to receive input by an operator for controlling the robot unit and the at least one second manipulator.

A fourth embodiment in combination with the first embodiment or the second embodiment and/or the third embodiment is directed to the at least one second manipulator being configured to support a high-capacity load and lock into a position while the robot unit performs the high-dexterity work, wherein the at least one second manipulator is hydraulically actuated to perform high-load-capacity manipulation, wherein a load capacity of the at least one second manipulator is at least five hundred pounds, wherein the at least one first manipulator is electromechanically actuated to perform high-dexterity manipulation, and wherein the at least one first manipulator comprises a plurality of joints providing at least six degrees of freedom.

A fifth embodiment in combination with the first embodiment or the second embodiment and/or the third and fourth embodiments is directed to a tool changer carousel coupled to the at least one first manipulator, and a plurality of tools for performing various high-dexterity jobs, wherein the tool is one of the plurality of tools.

A sixth embodiment in combination with the first embodiment or the second embodiment and/or the third and fourth embodiments is directed to a tool storage device comprising a plurality of tool attachments for storing tools, wherein the plurality of tool attachments comprises a location associated with the tool, wherein the location is stored in a memory, and wherein the location is referenced to automatically attach the tool to the at least one first manipulator for use.

A seventh embodiment in combination with the first embodiment and/or the third, fourth, fifth, and sixth embodiments, wherein the at least one first manipulator is configured to perform the high-dexterity work automatically, and wherein the at least one second manipulator is configured to perform the high-capacity work automatically.

An eighth embodiment is directed to a method of cooperative robotic aerial line work in an aerial work environment. The method comprises controlling a first manipulator of a robot unit attached to a boom tip of an aerial device to perform high-dexterity aerial work including manipulating fasteners; and controlling a second manipulator to perform high-capacity aerial work including lifting and holding an object, wherein the holding of the object by the second manipulator occurs simultaneously with the high-dexterity aerial work of the first manipulator.

A ninth embodiment in combination with the eighth embodiment further comprising capturing images of the aerial work environment by a first camera detecting visual light and a second camera detecting depth displaying the images of the aerial work environment by a head-mounted display associated with an operator in near real time; and receiving input by hand controls controlling the robot unit and the second manipulator in near real time.

A tenth embodiment in combination with the eighth embodiment comprising capturing images of the work environment by a first camera detecting visual light and a second camera detecting depth, generating a three-dimensional representation of the aerial work environment, and performing the high-dexterity aerial work and the high-capacity aerial work automatically based on the three-dimensional representation of the aerial work environment.

An eleventh embodiment in combination with the ninth or tenth embodiments comprising detecting a load applied to the first manipulator; and generating haptic feedback by hand controls to alert an operator of the load, wherein the first manipulator and the second manipulator are disposed on the boom tip of the aerial device.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
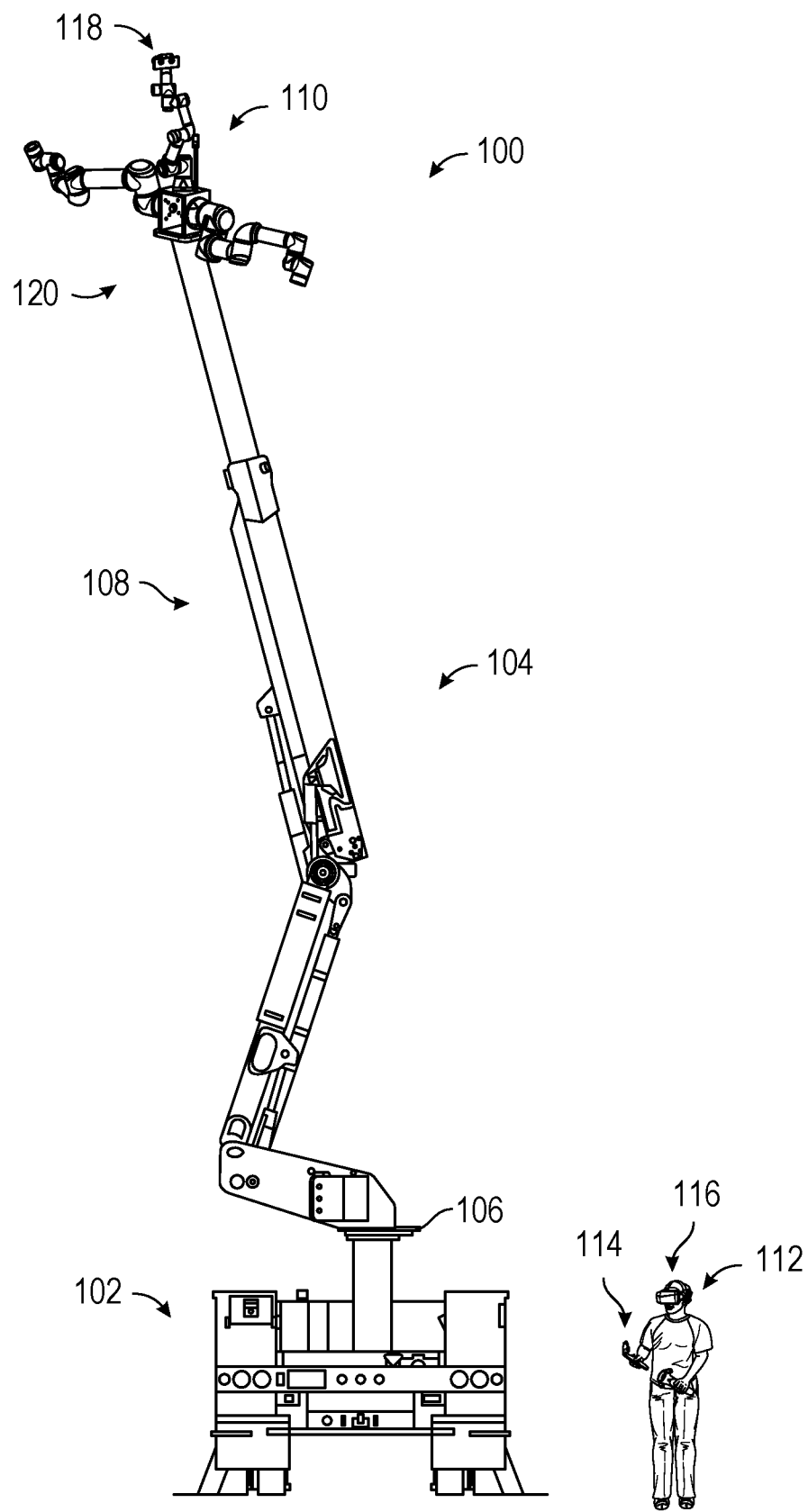
FIG. 1 depicts a robot unit attached to a boom tip of an insulating aerial device.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, a first exemplary embodiment of the current disclosure is directed to manipulators for use in combination with a remotely controlled or autonomously controlled robot unit. The manipulators may be any boom type manipulators, articulating arms, and/or the arms of the robot unit. The robot unit may be disposed at the end of a boom or on an aerial platform. In some embodiments, the manipulators may utilize various tools to complete jobs. The tools may be any typical lineman tools modified for attachment to the manipulators or may be specifically modified for ease of use with the robot controls. The tools may be attached to the manipulators using computer-executable instructions and in communication with a tool storage carousel. In some embodiments, the robot unit and high-capacity manipulators may be operated remotely by a ground-based operator or controlled automatically or fully autonomously.

Turning first to FIG. 1, aerial device 100 for some embodiments of the invention is depicted. Aerial device 100 may be attached to utility vehicle 102, as shown. In some embodiments, aerial device 100 comprises boom assembly 104, upper boom section 108, and boom implement 110 attached at boom tip 120. Additionally, aerial device 100 comprises turntable 106 disposed on utility vehicle 102, as shown. As aerial device 100 is operated near electrically powered cables, in some embodiments, boom implement 110 and boom assembly 104 comprise insulating material for insulating aerial device 100. Furthermore, any electrical components disposed on boom implement 110 and on boom assembly 104 may be self-contained and electrically isolated from the electrical components of utility vehicle 102. As such, a dielectric gap may be created between boom implement 110 and utility vehicle 102. In some embodiments, utility vehicle 102 may be any of a vehicle, a crane, a platform, a truck bed, a mechanical tree trimming apparatus, a hydraulic lift, or any other base capable of supporting boom assembly 104 and boom implement 110.

Figure 3:
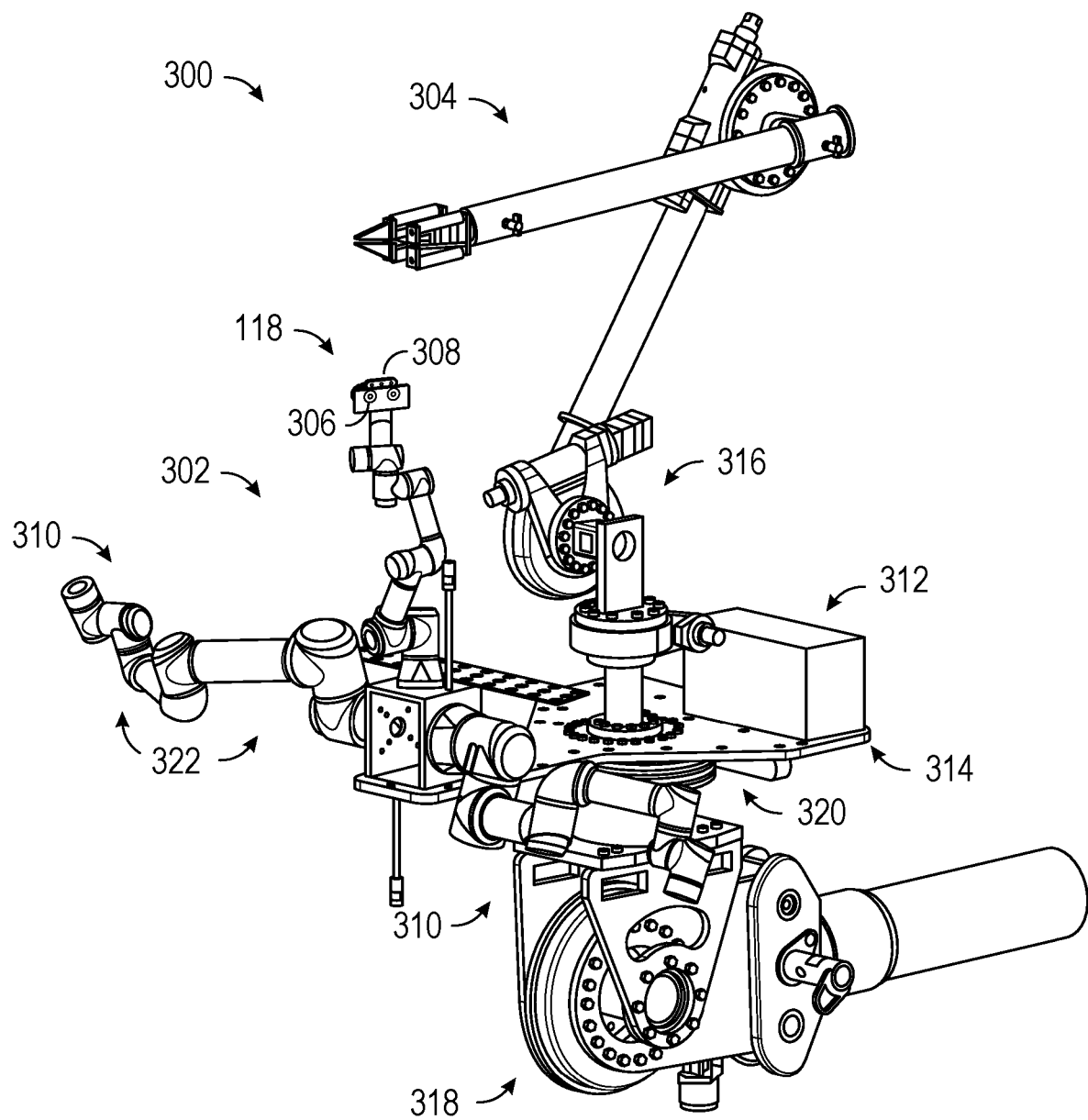
FIG. 3 depicts an embodiment of the robot unit and a high-capacity manipulator in cooperation.

In some embodiments, operator 112 may be positioned on boom implement 110 when boom implement 110 is a utility platform for performing work on or near high-voltage powerlines. Operator 112 may access upper controls disposed on a utility platform as well as hydraulic tools for performing work. In some embodiments, operator 112 on utility platform, may move to various positions using the upper controls. Furthermore, lower controls may be utilized at the base of aerial device 100 such as at utility vehicle 102 and at turntable 106. As shown, operator 112 is operating hand controls 114. Hand controls 114 may be any controller that may send a signal to aerial device 100 to control movement of boom assembly 104, utility vehicle 102, and boom implement 110. Hand controls 114 may comprise any switches, buttons, knobs, and sensors for detecting movement for controlling any displays associated with head-mounted display 116 and actuators associated with aerial device 100, robot unit 302 (FIG. 3) and high-capacity manipulator (FIG. 3).

In some embodiments, operator 112 may wear head-mounted display 116. Head-mounted display 116 may be connected to camera system 118, which may be one of a plurality of sensors of robot unit 302. Camera system 118 may be disposed on boom tip 120 proximate boom implement 110, which may be robot system 300. In some embodiments, a display may be mounted on a control board (not shown) that displays the images from camera system 118.

In some embodiments, camera system 118 may be connected to and communicate via a fiber-optic cable (not shown). The fiber-optic cable may be disposed between any device of boom implement 110 and any base components. In some embodiments, the fiber-optic cable is included to communicate signal across a dielectric gap. In some embodiments, the fiber-optic communication may provide high data transmission speed to reduce lag between camera system 118 and head-mounted display 116. Further, in some embodiments, a plurality of fiber-optic cables may be used to maintain the dielectric gap between aerial components and base components. In some embodiments, any communication described herein may also be performed using wireless communication between transmitters and receivers at the hand controls 114, head-mounted display 116, and aerial device 100.

Head-mounted display 116 may comprise at least one sensor for detecting a viewing angle and/or viewing position of operator 112 such as, for example, a three-axis accelerometer, gyroscope, and the like. Furthermore, head-mounted display 116 may comprise a visual display, speakers, microphone, and any necessary processors, data storage, and communication devices described in relation to the hardware components of FIG. 2 and FIG. 7. Head-mounted display 116 may be configured to be worn by operator 112. In some embodiments, head-mounted display 116 may be connected to a processor for processing the image signal. Alternatively, the processor may be disposed anywhere on aerial device 100 or on hand controls 114. Further, the processor may be part of a central computer, which may be disposed on utility vehicle 102 or in another remote location. In some embodiments, a plurality of processing elements or processors may be used. Additionally, the plurality of processing elements may be distributed across various locations.

In some embodiments, camera system 118 may comprise a plurality of cameras detecting visible light, infrared light, or may be a specialized camera such as cloud point for detecting depth. In some embodiments, camera system 118 comprises a gimbal mount allowing rotation of camera system 118 to view 360 degrees. Gimbal mount may provide three-axis rotation and may be rotated by a motor or a plurality of motors on the gimbal mount. In some embodiments, three motors are operable to control roll, pitch, and yaw of camera system 118 and robot unit 302 may comprise several joints for providing at least 3 degrees of freedom for camera system 118. Camera system 118 may be communicatively connected to head-mounted display 116 such that operator 112 sees the images from camera system 118. Furthermore, the position sensors in head-mounted display 116 may be operable to relay information to camera system 118 such that camera system 118 moves according to the motion of the head of operator 112. In some embodiments, camera system 118 may be a plurality of cameras pointing different directions providing a 180-degree view that may be stitched together to provide a wide-angle view to operator 112 or provide motion with the viewers gaze to provide low latency visualizations.

Figure 2:
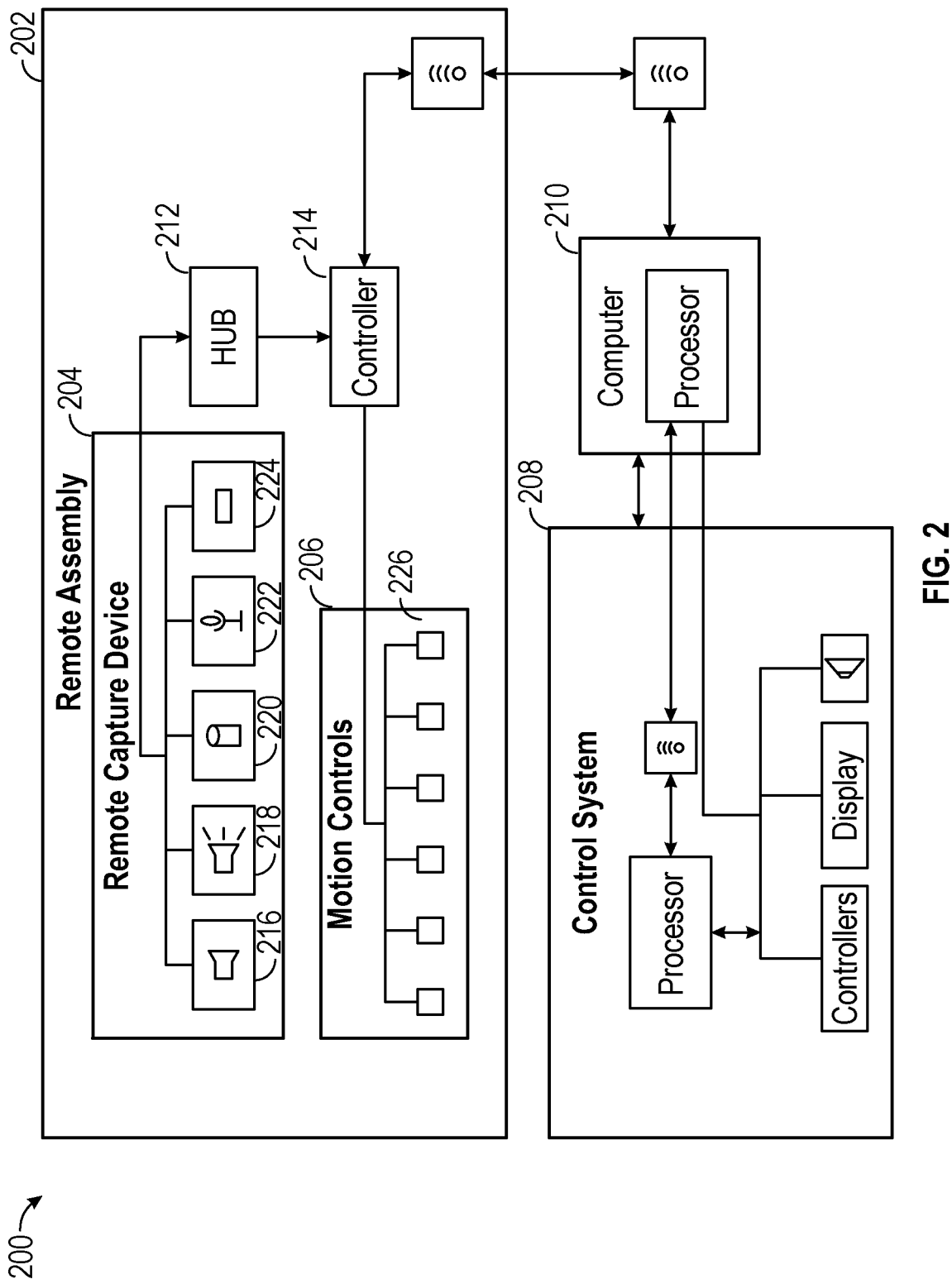
FIG. 2 depicts an exemplary embodiment of hardware components for some embodiments of the disclosure.

FIG. 2 depicts an exemplary block diagram 200 related to embodiments of the present invention. In some embodiments, robot system 300 comprises various assemblies for capturing sensory information and/or for performing actions, such as repair work on power lines and in a telecommunications setting. Robot system 300 may comprise various circuitry, parts, or other components for capturing sensory information at remote assembly, including video by video sensor 216, which may be camera 306, three-dimensional depth information from 3D camera 218, which may be depth camera 308, audio by microphone 222, and other sensory data by sensors 224 depicted in FIG. 2. Further, any information may be stored in data store 220. Remote capture device 204 may comprise various microphones, speakers, data stores, processors, transmitters, receivers, and any other components. In some embodiments, camera 306 and depth camera 308 may be camera system 118. Camera system 118 may comprise any camera type including any digital, analog, mirrored or mirrorless, red-green-blue (RGB), infrared, radio, point cloud, or the like. In some embodiments, camera system 118 may be a plurality of cameras in any combination of the camera types mentioned.

Further, robot system 300 may comprise a manually controlled or autonomous robot unit 302 that may be positioned at the end of boom assembly 104 for interacting with a work site to perform one or more tasks. For example, as described above, in many real-life scenarios, tasks to be performed may not be discovered until reaching the job site, and accordingly, robot system 300 may comprise a variety of tools, features, or functions to respond to a variety of tasks. Additionally, as described in greater detail below, robot system 300 may further comprise one or more parts, components, or features for providing operator 112 with sensory information, providing operator 112 with additional information about the work environment to improve efficiency, efficacy, and/or safety of robot system 300 and operator 112. In some embodiments, robot unit 302 and high-capacity manipulator 304 may be adapted as a dynamically movable robot, capable of responding to natural movement inputs from operator 112, to provide a realistic field of view and sensory information provided by remote assembly 202. Accordingly, robot system 300 may comprise various parts for capturing, storing, receiving, and/or transmitting data or information.

As depicted in block diagram 200, robot system 300 comprises remote assembly 202 comprising at least remote capture device 204, computing platform 210, and control system 208. In some embodiments, remote capture device 204 may comprise camera system 118, as well as sensors 224 (e.g., accelerometer, strain gauge, gyroscope, inclinometer, thermometer, pressure sensor), and other apparatuses that may be utilized by remote capture device 204 for the capturing of sensory information. Remote capture device 204 may be mounted or positioned on a selectively movable mount or portion of robot unit 302, high-capacity manipulator 304, or any other part of robot system 300 or boom tip 120. Accordingly, via robot unit 302, sensory information may be captured by remote capture device 204. However, in further embodiments, remote capture device 204 may be a standalone unit, able for independent control from robot unit 302 or other additional apparatus. For example, in some embodiments, remote capture device 204 may be mounted on a polearm or other mechanical arm (high-capacity manipulator 304) or controllable limb. In further embodiments, remote capture device 204 may be mounted on or incorporated into an aerial drone.

In some embodiments, remote capture device 204 may further comprise depth camera 308 or other devices configured for capturing three-dimensional depth information. In some embodiments the depth camera 308 may be utilized for capturing depth information within a field of view for creating a point-cloud, 3-D model, or other digital representation of an object or area scanned or viewed. Remote capture device 204 may comprise at least one depth camera 308 for the capturing of three-dimensional information or other data. Depth camera 308 may be operated in conjunction with, or independent from camera 306 or other components or parts of remote assembly 202 and/or remote capture device 204. In response to instructions or an input, depth camera 308 may begin capturing three-dimensional information about an object or work environment within a field of view. Like the captured video with respect to camera 306, the three-dimensional depth information captured by depth camera 308 may be saved locally or remotely. In some embodiments, remote capture device 204 may comprise a separate memory for video captured by camera 306 and a separate memory for three-dimensional information captured by depth camera 308. In some embodiments, each component of remote assembly 202 may comprise the hardware components described in reference to FIG. 12.

In some embodiments, remote assembly 202 may further comprise at least one digital hub 212. In some embodiments, remote assembly 202 further comprises at least one digital hub 212 and at least one digital to fiber-optic converter. The digital hub 212 may receive visual sensory information from camera system 118 as well as audio sensory information from microphone 222 and sensors 224 as described herein. Digital hub 212 is operable to send a signal associated with the sensory information, which comprises the visual sensory information and the audio sensory information to the digital to fiber-optic converter. The digital to fiber-optic converter converts the sensory information into a fiber-optic signal or wireless signal which is sent through the fiber-optic cable or by wireless communication to computing platform 210, which, in some embodiments, may be computer system 1200.

As further depicted in FIG. 2, remote assembly may further comprise a controller 214. In some embodiments, controller 214 may be a processor or other circuitry or computer hardware or computer system 1200 (FIG. 12) for receiving commands or instructions from control system 208 and/or computing platform 210 and for relaying or providing commands to remote capture device 204 and/or motion controls 206. Accordingly, in some embodiments, instructions, or commands from controller 214 may be sent to remote capture device 204. Controller 214 may be used to send instructions to cause remote assembly 202, remote capture device 204, and/or motion controls 206 to perform actions corresponding to the instructions.

As further depicted in the block diagram of FIG. 2 and in some embodiments, remote assembly 202 may further comprise motion controls 206. Motion controls 206 may be configured and adapted for controlling the movement of remote assembly 202, including any utility arms or camera mounts as described in greater detail below. In some embodiments, remote assembly 202 may comprise a 6 or more DOF robot unit 302 configured with high-dexterity manipulators 310 and/or camera mounts that can move with 6 DOF. Accordingly, motion controls 206 may be configured to provide instructions or commands to remote assembly 202 to move in at least 6 DOF. In some embodiments, motion controls 206 may comprise motion control components 226 providing actuators providing linear and rotational motion in x, y, and z-axis. It will be appreciated however, that remote assembly 202 may comprise varying designs, and in some embodiments, may move in fewer than 6 DOF. As described herein, robot unit 302 comprises high-dexterity manipulators 310, which may have 6 DOF, while high-capacity manipulator may move in 2-3 DOF.

As described above, motion controls 206 may be in communication with controller 214. Instructions or commands from controller 214 may be sent to motion controls 206. Upon receipt of the instructions, the corresponding motion control components 226 may be instructed to cause movement of remote assembly 202 (e.g., robot system 300) based on the received instructions. As described above, one or more arms or limbs of remote assembly 202 may be configured to move with 6 DOF. Based on the instructions, the corresponding motion controls 206 may cause movement of the remote assembly 202 to correspond to the instructions.

FIG. 3 illustrates an exemplary embodiment of a remotely operated robot system 300. In some embodiments, boom assembly 104 and implement 110 may generally comprise robot system 300. Further, robot system 300 may correspond to remote assembly 202 as described above with respect to FIG. 2 and may comprise any and all of the components or parts as described above. In some embodiments, robot system 300 may be configured and adapted to receive instructions from a computer or operator 112 to perform a corresponding movement or action. In some embodiments, robot system 300 may be a fully manually controlled robot, wherein the robot system 300 will not perform a movement or action absent an instruction provided by operator 112. In further embodiments, robot system 300 may be fully automated or autonomous robot, wherein robot system 300 performs actions or movements based on pre-programmed or learned instructions. In even further embodiments, robot system 300 may be configured to respond to both manually input instructions and automated programming. Accordingly, the various movements or actions performed by robot system 300 and described herein may be performed based on manually provided instructions and/or automated and/or learned programming. For example, robot system 300 may operate in a semi-autonomous state. Operator 112 may be prompted and select a bolt to tighten and robot unit 302 tightens the bolt autonomously.

In some embodiments, and as depicted in FIG. 3, in addition to robot unit 302, boom assembly 104 and implement 110 may further comprise at least one high-capacity manipulator 304 or additional robotics assemblies that may operate separately or in cooperation with robot unit 302. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the delicate structural components to perform fine-tuned actions. By way of non-limiting example, in telecommunication repairs, heavy parts may need to be lifted from the ground to a telecommunication pole. Lifting a heavy part may require robotics configured for transporting heavy loads, or high-capacity manipulator 304. However, once in position, the part may need robotics configured for delicate or sophisticated operations to install the part in position, such as high-dexterity manipulators 310. Embodiments of the present invention, solve this dilemma by pairing robot unit 302 configured and adapted for fine tuning utilizing high-dexterity manipulators 310 with high-capacity manipulator 304 configured and adapted for load bearing or transporting heavy loads. For example, in some embodiments, robot unit 302 may be configured and adapted for performing movements or actions directed to sophisticated, delicate, or fine-tuning work, such as untying tie wire 406 (FIG. 4), cutting wire, and/or manipulating fasteners like screws, nuts, bolts, and the like.

In some embodiments, robot unit 302 may comprise camera 306 for capturing visible light, including video or still images. Camera 306 may be positioned on robot unit 302 for capturing at least one field of view of an area, including for example, a job site or robot work environment 400. In some embodiments, robot unit 302 may comprise a plurality of cameras such as camera system 118. In embodiments comprising a plurality of cameras, two or more cameras may be positioned to capture a substantially identical field of view. In further embodiments comprising camera system 118, two or more cameras may be positioned to capture multiple fields of view.

In some embodiments, robot unit 302 may further comprise at least one depth camera 308 for capturing three-dimensional depth information. The three-dimensional data from depth camera 308 may be used to determine a position of an object in view such that high-capacity manipulator 304 and high-dexterity manipulators 310 may interact with the objects in view automatically or autonomously. Furthermore, in-depth information may be provided to operator 112 to gain a better understanding of the location of the objects in view.

In further embodiments, robot unit 302 may comprise one or more additional capture devices or sensors 224 for capturing additional information that may be analyzed and/or presented to a user or operator 112. For example, in some embodiments, robot unit 302 may comprise a thermometer or heat sensor for capturing heat information. In some embodiments, robot unit 302 may comprise an electrical sensor for capturing electrical data. For example, robot unit 302 may be used to work on power lines or in other scenarios involving live power lines or other electrically charged wires or circuitry. Accordingly, to avoid damage to robot unit 302, boom assembly 104, or utility vehicle 102, at least one sensor may be a sensor for detecting an electrical current or electrical field. Robot system 300 may be configured for responding to the movement of operator 112 and performing a corresponding movement. Accordingly, in some embodiments, sensors 224 may be one of an accelerometer, a gyroscope, a light sensor, or any other type of sensor suitable to detect the viewing angle of operator 112. Similarly, sensors 224 may be operable to detect the viewing position of operator 112. In some embodiments, it may be preferable that the sensors 224 detect a change in the viewing angle or a change in the viewing position of operator 112.

In some embodiments, a plurality of different types of sensors in various locations may be used to include redundancy or to increase accuracy. For example, an accelerometer may be used to detect an acceleration signal, the acceleration signal may be integrated to yield a velocity signal which may then be compared to a velocity signal detected by a gyroscope, wherein each of the accelerometer and the gyroscope use a light sensor as a reference. It should be understood that, in some embodiments, any of sensors 224 described herein may be included in head-mounted display 116, hand controls 114, and on the robot system 300. Sensors 224 on the robot system 300 may be used to collect sensory information or as part of the control process to adjust robot system 300 to match the viewing parameter of operator 112. For example, a first accelerometer may be placed on the head-mounted display 116 to sense movement of the head-mounted display 116 and a second accelerometer may be placed on camera system 118. The readings of the first accelerometer and the second accelerometer may be compared and used by controller 214. In some embodiments, controller 214 may use the data from the second accelerometer as a feedback signal to control movement of camera system 118. Alternatively, in some embodiments, a plurality of sensors such as accelerometers, gyroscopes, magnetometers, GPS, (e.g., pose sensor) and the like may be used in head-mounted display 116. Inverse kinematics may be used to convert the pose reference into joint angles and move camera system 300 joints with rotary encoder feedback. As described below, in some embodiments, the sensor data may be used by controller 214 to operate both high-dexterity manipulators 310 and high-capacity manipulator 304. Furthermore, sensors 224 may detect loads on robot system 300 for operating interlocks and initiating warnings to operator 112.

In some embodiments, robot unit 302 may comprise central hub 312. Central hub 312 may house a processor, a power source, circuitry, a wireless communication means among other electronics for operation of robot system 300 as described in reference to FIG. 12 below. Any of the controls, communications, and sensory data described herein may be processed through central hub 312. Central hub 312 may be disposed on platform 314, at aerial device 100, utility vehicle 102, or at a remote location.

Further depicted in FIG. 3 is boom tip 120 comprising boom tip actuator 318. Boom tip actuator 318 may rotate platform 314 in a pitching motion to adjust robot unit 302 and high-capacity manipulator 304 into a working position. In some embodiments, platform 314 provides a base for robot unit 302, high-capacity manipulator 304, and central hub 312. Platform 314 may be supported by aerial turntable 320 operable to rotate platform 314 in a yawing motion.

Furthermore, a plurality of high-capacity manipulator actuators 316 may be provided to actuate high-capacity manipulator 304.

Continuing with the embodiment depicted in FIG. 3, robot unit 302 comprising high-dexterity manipulators 310 are illustrated as supported by platform 314 attached to boom tip 120. As shown, high-dexterity manipulators 310 may comprise a plurality of boom sections 322. Each boom section of the plurality of boom sections 322 may provide rotation and/or provide many degrees of freedom for high-dexterity manipulators 310; however, as described below, degrees of freedom may reduce load capacity. As such, robot unit 302 may comprise high-dexterity manipulators 310 capable of load limits of approximately 35 pounds or more. Alternatively, high-capacity manipulator 304 may comprise any number of degrees of freedom; however only one to three degrees of freedom are typical, thus, allowing high-capacity manipulator 304 to lift heavier loads up to thousands of pounds depending on the specific arm and arrangement of high-capacity manipulator 304. Accordingly, high-capacity manipulator 304 may be operated in cooperation with high-dexterity manipulators 310 to perform a variety of high-dexterity and high-capacity work.

In some embodiments, high-capacity manipulator 304, and high-dexterity manipulators 310 may be supported on a single boom, as shown. Furthermore, in some embodiments high-capacity manipulator 304 may be supported by a separate boom and/or a separate truck or platform.

As shown, high-capacity manipulator 304 may provide over-the-shoulder assistance to robot unit 302. High-capacity manipulator 304 may reach over, around, or under robot unit 302 to lift and support objects that may be too heavy or large for high-dexterity manipulators 310 of robot unit 302. As discussed above, high-capacity manipulator 304 may support large and heavy structures while high-dexterity manipulators 310 of robot unit 302 perform repair, attachment, maintenance, as well as any other high-dexterity tasks that may be required by robot unit 302.

Figure 4:
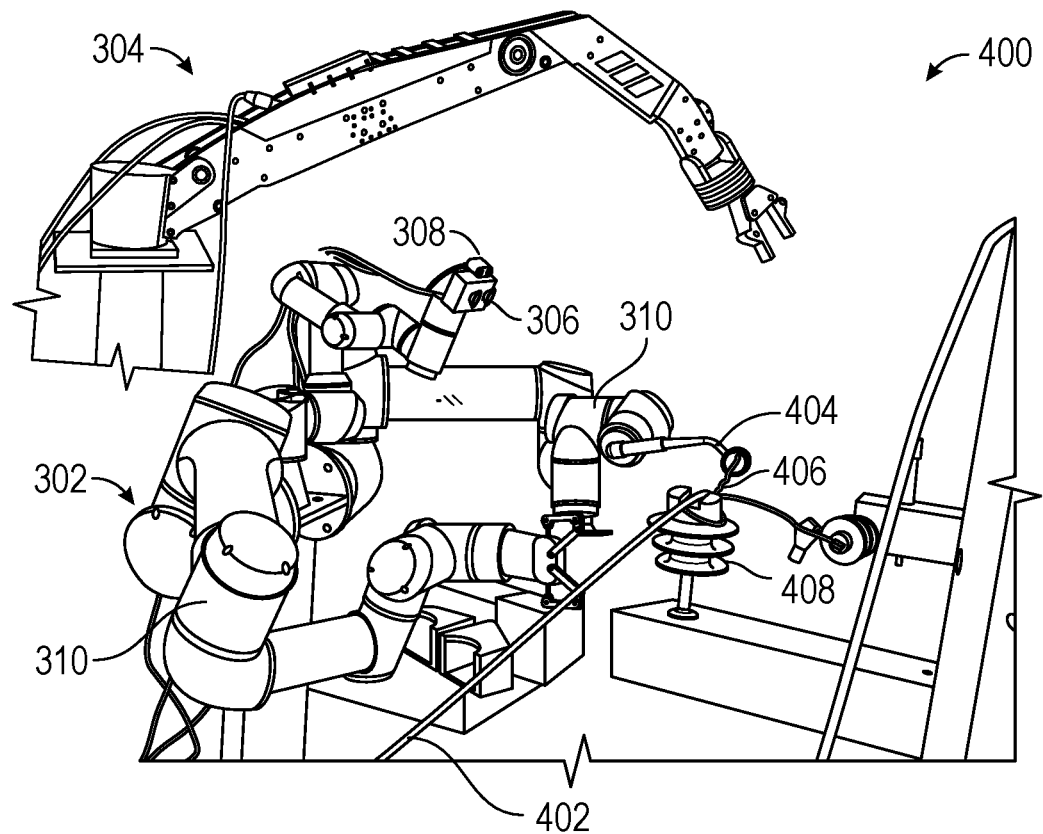
FIG. 4 depicts an embodiment of the robot unit performing high-dexterity work.

FIG. 4 depicts robot unit 302 working on power line 402. In some embodiments, a plurality of manipulators may be used simultaneously. High-dexterity manipulators 310 may be used for fine operations such as, for example, manipulating nuts and bolts and removing tie wire 406 to remove power line 402 from conductor 408 as shown. In some embodiments high-capacity manipulator 304 may be used for heavy lifting such as, for example, lifting three-phase cross members, transformers, and the like. High-dexterity manipulators 310 typically require small parts that may be less equipped to handle large loads. As such, high-dexterity manipulators 310 are typically also low-capacity manipulators. Alternatively, high-capacity manipulator 304 may require relatively large parts decreasing the dexterity.

Furthermore, as discussed above, there is a tradeoff between degrees of freedom providing high dexterity, high capacity, and manipulator costs. As degrees of freedom of a manipulator increase, capacity decreases. Reducing the complexity of high-dexterity manipulators by reducing the degrees of freedom allows for increased capacity. In some embodiments, a system of high-capacity manipulators and high-dexterity manipulators may be utilized in combination to perform tasks. High-capacity manipulators may remove or lift large objects while high-dexterity manipulators perform repairs or maintenance tasks. Any of the high-capacity manipulators and high-dexterity manipulators may be controlled manually by hand controls 114, automatically, or autonomously as described herein. As such, high-dexterity manipulators 310 may be used in combination with high-capacity manipulator 304 as shown in FIG. 4. High-dexterity manipulators may have three, six, or more degrees of freedom, while high-capacity manipulator 304 may only have one to three. Similarly, high-dexterity manipulators may apply loads of up to 200-300 pounds while high-capacity manipulators may lift thousands of pounds.

Continuing with FIG. 4, robot unit 302 performs an exemplary tie-wire removal job. In an exemplary embodiment utilizing high-dexterity manipulators 310, robot unit 302 may be controlled to remove tie wire using ring tool 404. Operator 112 may be at a remote location such as, on the ground, in a cab of vehicle 102, in a specially designed trailer for operating robot system 300, in a home office, or the like. Operator 112 may view images from camera system 118 by head-mounted display 116 and control robot unit 302 by hand controls 114. As operator moves hand controls 114, robot unit 302 may nearly simultaneously move high-dexterity manipulators 310. Operator 112 may view robot work environment 400 by moving their head, and head-mounted display 116, to look around. As operator 112 moves, camera system 118 may move corresponding to the movements of head-mounted display 116. As such, operator 112 may move manipulating, camera system 118 and high-dexterity manipulators 310 as if operator 112 is in the position of robot unit 302.

Similarly, operator 112 may switch modes by voice activation utilizing microphone 222 or an input on hand controls 114. Operator 112 may switch controls between robot unit 302 and high-capacity manipulator 304. Operator 112 may be provided a visualization such as a head-up display by head-mounted display 116 showing menu over the visualization from camera system 118 providing an augmented display. Operator 112 may select items on the menu changing operational modes.

Figure 6:
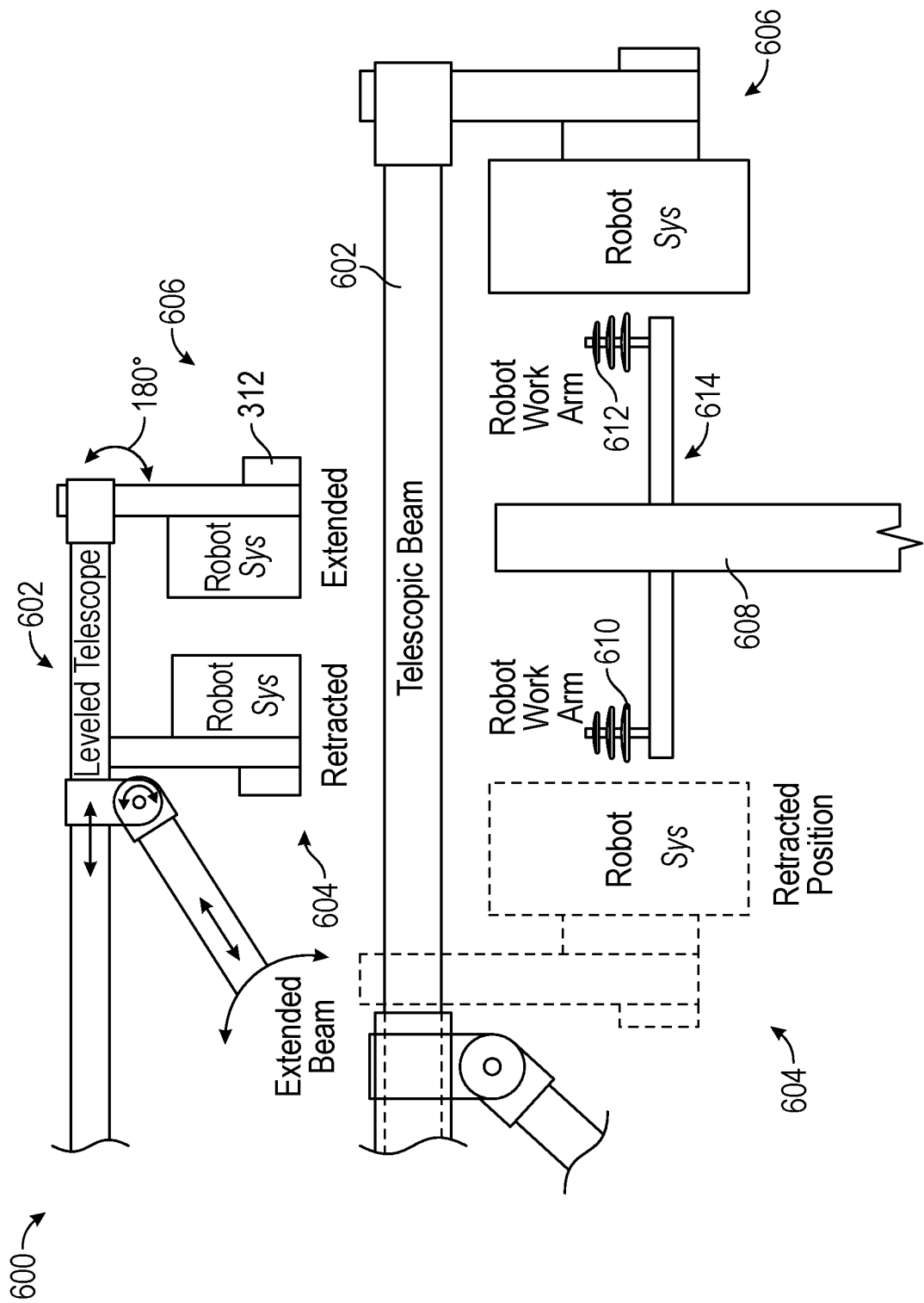
FIG. 6 depicts an embodiment of an exemplary work environment.

In some embodiments, robot unit 302 may take a picture or video of robot work environment 400 and work automatically. Generally, a work environment may be any local environment where the work of robot system 300 may be performed. For example, FIG. 4 and FIG. 6 depict work environments. Computer-executable instructions may be stored to control robot unit 302 to remove tie wire 406 by ring tool 404 through a series of automated or instructed movements. The series of movements may be based on the tool, the work environment, and the job. Here the tool is ring tool 404, the work environment is robot work environment 400 viewed by camera system 118, and the job is to remove tie wire 406.

In some embodiments, controller 214 may be a feedback controller and may utilize resistance of tie wire 406 as well as visual cues to verify that the work is performed properly. Furthermore, robot unit 302 may go through a process of characterization utilizing machine learning algorithms such as, for example, neural networks. Robot unit 302 may recognize obstacles, damaged parts, and any other obstacles to perform the required work. Robot unit 302 may store a set of instructions for removing the obstacles. To perform these tasks, robot unit 302 may change tools periodically as described in embodiments below. Furthermore, robot unit 302 may work cooperatively with high-capacity manipulator 304 to complete the work as described in embodiments herein.

In some embodiments, robot unit 302 may assess robot work environment 400. Robot unit 302 may observe robot work environment 400 with camera system 118 and store data indicative of robot work environment 400. In some embodiments, camera system comprises a telescopic boom comprising a camera on the end for moving around robot environment and capturing the locations of object that may be obstructed for camera 308 and depth camera 306. Robot unit 302 then stores the location of any obstacles and the locations of the objects for work to be performed.

Once all the robot work environment information is known, robot unit 302 may run through an automated sequence to perform work. Robot unit 302 may then utilize ring tool 404 to connect to tie wire 406 and rotate tie wire 406 removing tie wire from power line 402 using an automated sequence of stored instructions. The various sensors, such as camera system 118 and sensors 224, may be used to verify that the work is performed correctly.

In some embodiments, robot unit 302 performance may be recorded and stored. All sensor data output may be stored to further update the sequences and processes to create a more efficient process in the future. Furthermore, in some embodiments, the sequences may be performed in reverse to optimize storage. For example, high-dexterity manipulators 310 may go through successive rotations to remove tie wire 406. In some embodiments, tie wire 406 may be replaced, in some steps, by performing the removal process in reverse.

The above-described controls and sets of automated instructions may be used to perform work using high-capacity manipulator 304. Similarly, robot work environment 400 may be used in cooperated work with high-capacity manipulator 304 as shown in FIG. 4. Work for high-capacity manipulator 304 may be controlled similarly by the tool, the job, and the work environment. All control, automated, and autonomous operation may be based on robot work environment 400, the tool used, and the job to be performed. As such, high-capacity manipulator 304 may have a customized set of controls and executable instructions, but the methods may be similarly described as high-dexterity manipulators 310 above.

Figure 5:
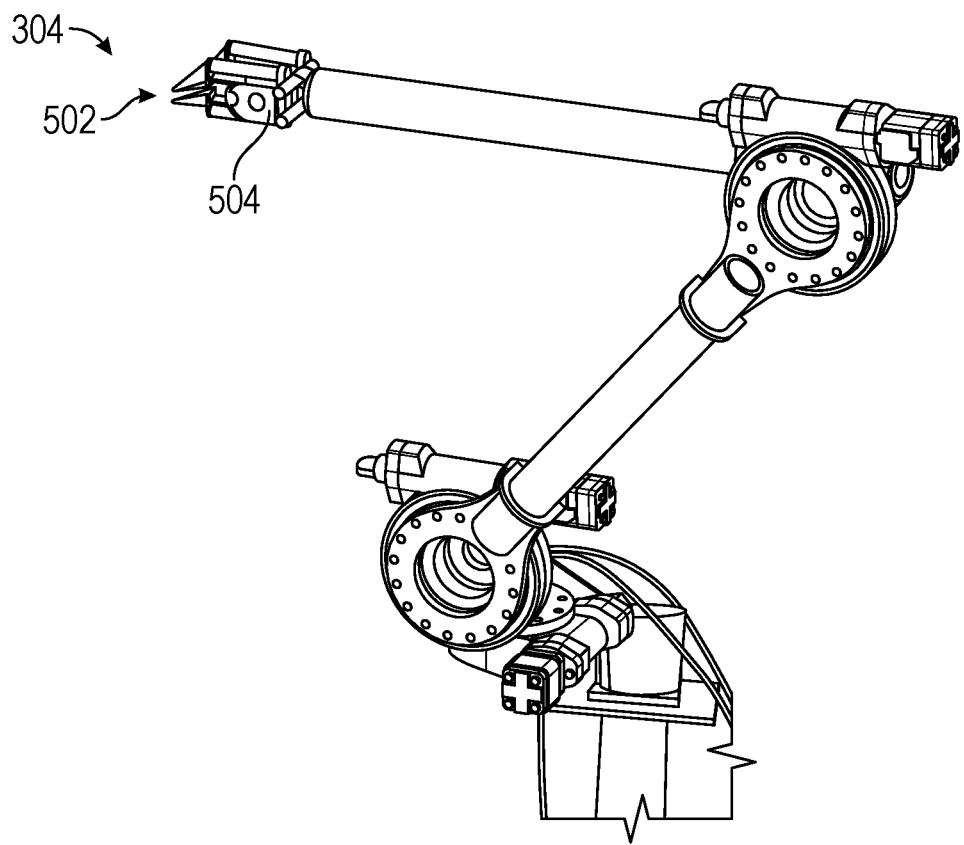
FIG. 5 depicts an embodiment of the high-capacity manipulator.

FIG. 5 depicts an exemplary embodiment of high-capacity manipulator 304 comprising three degrees of freedom. Two actuators at the boom end 502 may provide rolling motion and yawing motion to high-capacity manipulator 304 comprising high-capacity tool 504. In some embodiments, high-capacity manipulator 304 may be used in conjunction with high-dexterity manipulators 310 as described above. High-capacity manipulator 304, shown in FIGS. 3-5 may comprise a plurality of sections that provide rotation and translation. However, these sections may be limited to fewer than high-dexterity manipulators 310 to reduce complexity and increase capacity as described above. Furthermore, high-capacity manipulator 304 may be hydraulically, pneumatically, and/or electromechanically operated. High-capacity manipulator 304 may be made of steel and may be hydraulically actuated to support extremely heavy loads relative to the 200-300-pound limits on high-dexterity manipulators 310. For example, high-capacity manipulator 304 may support loads of over 1,000 pounds. However, the material and design of high-capacity manipulator 304 may be selected for the expected work to be performed.

In some embodiments, high-dexterity manipulator 304 or sections thereof may be dielectrically insulating (e.g., comprising fiberglass). This allows high-capacity tool 504 to contact objects with different electrical potential than the remainder of boom end 502.

High-capacity manipulator 304 may be mounted close to robot unit 302, as shown in FIGS. 3-4, such that there is a short distance between high-capacity manipulator 304 and the objects that need lifting and placing. The closer high-capacity manipulator 304 is to the target object and the location for placement the less stress that is applied to the high-capacity manipulator 304. Furthermore, a relatively short high-capacity manipulator arm may be used. Therefore, it may be advantageous, in some embodiments, to mount high-capacity manipulator 304 on platform 314 providing a relatively short distance between the base of high-capacity manipulator 304 and the objects. In some embodiments, various arms of different lengths and different capacities may be interchangeable. For example, a shorter higher capacity arm may be switch out for a longer lower capacity arm or vice verse. Furthermore, this provides a specific stationary location for high-capacity manipulator 304 such that the relative location between high-capacity manipulator 304 and robot unit 302 is known and unchanging. Therefore, cooperation between high-capacity manipulator 304 and robot unit 302 may be simplified for both operator 112 and automation algorithms.

In some embodiments, high-capacity manipulator 304 may be disposed on a separate aerial device than aerial device 100 providing support to robot unit 302. Though, high-capacity manipulator 304 may be supported on a separate aerial device, high-capacity manipulator may comprise a set of controls, transceivers, processors, as described in reference to FIG. 2 and FIG. 12 for communicating with robot unit 302, central hub 312, hand controls 114, and head-mounted display 116. As such, high-capacity manipulator 304 may be controlled by operator 112, automatically, and autonomously in cooperation with robot unit 302.

In some embodiments, the load that high-capacity manipulator 304 manipulates may be known, or may be determined, and may be monitored. High-capacity manipulator 304, and similarly, robot unit 302 may comprise sensors 224 such as, for example, accelerometers, strain gauges, pressure transducers, inclinometers, and the like. The data from sensors 224 may be used to determine the load on, and the geometry of, high-capacity manipulator 304. The load and geometry data may be compared to stored data to determine a percent limit load and/or determine if the detected load and geometry are in an acceptable range. The load may be monitored in real time and controller 214 may prevent any manipulators from entering a geometry that induces loads above designated thresholds.

The same load monitoring principles applied to high-capacity manipulator 304 may be applied to robot unit 302. Robot unit 302 may comprise sensors 224 such as, for example, accelerometers, strain gauges, pressure transducers, inclinometers, and the like. The data from sensors 224 may be used to determine the load on, and the geometry of, robot unit 302. The load and geometry data may be compared to stored data to determine a percent limit load, and/or if the detected load and geometry are in an acceptable range.

In some embodiments, load data may be monitored as described above, and indications of load may be provided to operator 112. For example, visual and audible alerts may be sent to operator 112 by hand controls 114 or head-mounted display 116. In some embodiments, the load data may be compared to limit load to a load threshold and haptic feedback may be provided to operator 112. For example, operator 112 may attempt to control high-dexterity manipulators 310 to a location, but an obstacle may be in the path. When high-dexterity manipulators 310 presses against the obstacle, sensor data from sensors 224 on board robot unit 302 may be compared to the input controls to determine if the actual output is aligning with the input in a feedback control loop. When it is determined that an error has taken place, hand controls 114 may vibrate to inform operator 112 that an obstacle is in the path. Controller 214 may automatically decrease or eliminate the operation of high-dexterity manipulators 310 through that point and update robot work environment 400. Operator 112 may view robot work environment 400, view the obstacle, and remove the obstacle using robot unit 302 or high-capacity manipulator 304.

In some embodiments, camera system 118 may be mounted on high-capacity manipulator 304. Camera system 118 may be included in remote capture device 204 such that any data obtained by high-capacity manipulator 304 may be utilized cooperatively with robot unit 302 in manual, automatic, and/or autonomous modes. Embodiments of remote assembly 202 described herein may similarly be applied to high-capacity manipulator 304.

In some embodiments, operator 112 may be positioned in an aerial platform of a separate aerial device. Operator 112 may be situated a minimum distance from the performed work but may have a good view of the operations. In some embodiments, an aerial line worker may be positioned in an aerial platform of aerial device 100 and perform work alongside robot unit 302 and high-capacity manipulator 304.

FIG. 6 depicts an exemplary utility line work environment 600 for robot system 300 utilizing robot unit 302 and high-capacity manipulator 304. In some embodiments, boom assembly 104 may comprise telescopic arm 602. Telescopic arm 602 may be retracted in retracted position 604 or in extend position 606. In some embodiments, robot unit 302 may be positioned on platform 314 at boom tip 120 on telescopic arm 602. Furthermore, high-capacity manipulator 304 and central hub 312 may also be positioned on platform 314 or as described above. In some embodiments, high-capacity manipulator 304 may be positioned on a separate aerial device. Either way, in retracted position 604, telescopic arm 602 may provide robot system 300 to a near side of utility pole 608 for working on near-side phase and near-side insulator 610. Furthermore, when telescopic arm 602 is extended, robot system 300 may be operable to work on far-side conductor and far-side insulator 612. In some embodiments, a plurality of sensors and processors may be utilized to determine the location of utility pole 608 and cross member 614 such that robot system 300 may be positioned automatically. In some embodiments, operator 112 may position robot system 300 to perform work using camera system 118, head-mounted display 116, and hand controls 114.

Figure 7:
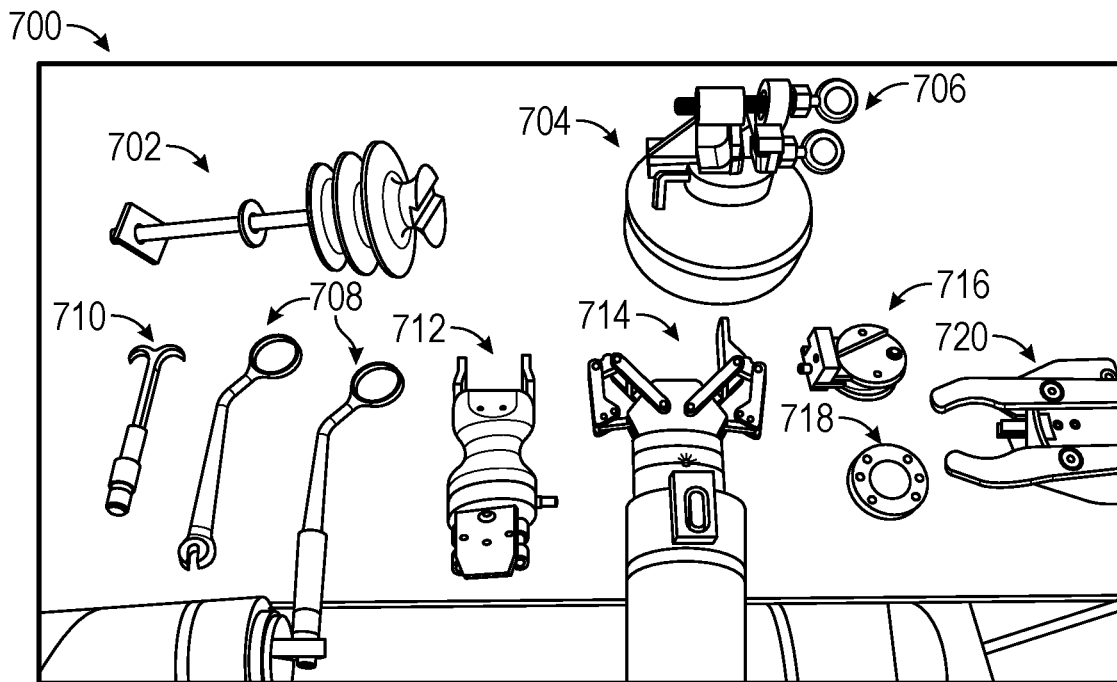
FIG. 7 depicts exemplary tools to be used with the robot unit and the high-capacity manipulator.

FIG. 7 depicts exemplary specialized tools 700 that may be used by robot unit 302 and high-capacity manipulator 304. In some embodiments, specialized tools 700 may be used to couple to manipulators and to provide simple use for high-dexterity manipulators 310 of robot unit 302 and high-capacity manipulator 304 manually controlled or controlled by control algorithms. In some embodiments, insulator 702 may be adapted to provide a long rod portion for ease of gripping by high-dexterity clamp 712. Furthermore, insulator 704 may be fashioned with ring bolts 706 such that robot unit 302 may utilize high-dexterity clamp 712 for grabbing and rotating. Various hot-stick tools may be adapted to couple to the manipulators to provide ease of use. Hot-stick ring tools 708 may be provided in various sizes to be used in tie-wire wrapping and unwrapping (e.g., FIG. 4) and hot line hook 710 may be used to simplify snagging a cable. Similar to high-dexterity clamp 712, 4-bar linkage gripper 714 may be adapted or configured to be couple to high-capacity manipulator 304 providing high-capacity gripping. Further, a phase cutter (not shown) may be modified to couple to high-dexterity manipulators 310 and high-capacity manipulator 304 as well. Furthermore, clamp 720, tool adapter 716 and manipulator adapter 718 may be used to couple specialized tools 700 to the manipulators and to various tool holders while specialized tools 700 are not in use. Robot unit 302 and high-capacity manipulators 304 may switch tools using clamp 720 as described in embodiments below. Any tools may be adapted or configured to couple to high-dexterity manipulators 310 and high-capacity manipulator 304.

Figure 8:
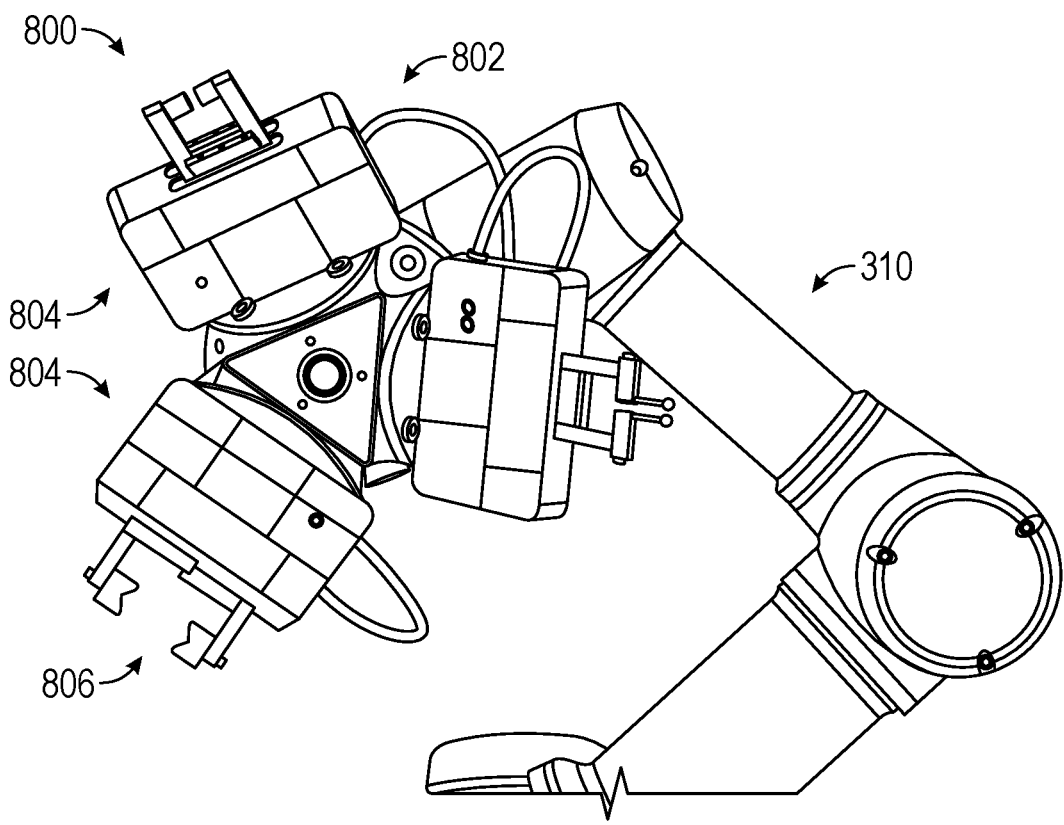
FIG. 8 depicts an embodiment of a tool changer carousel.
Figure 9:
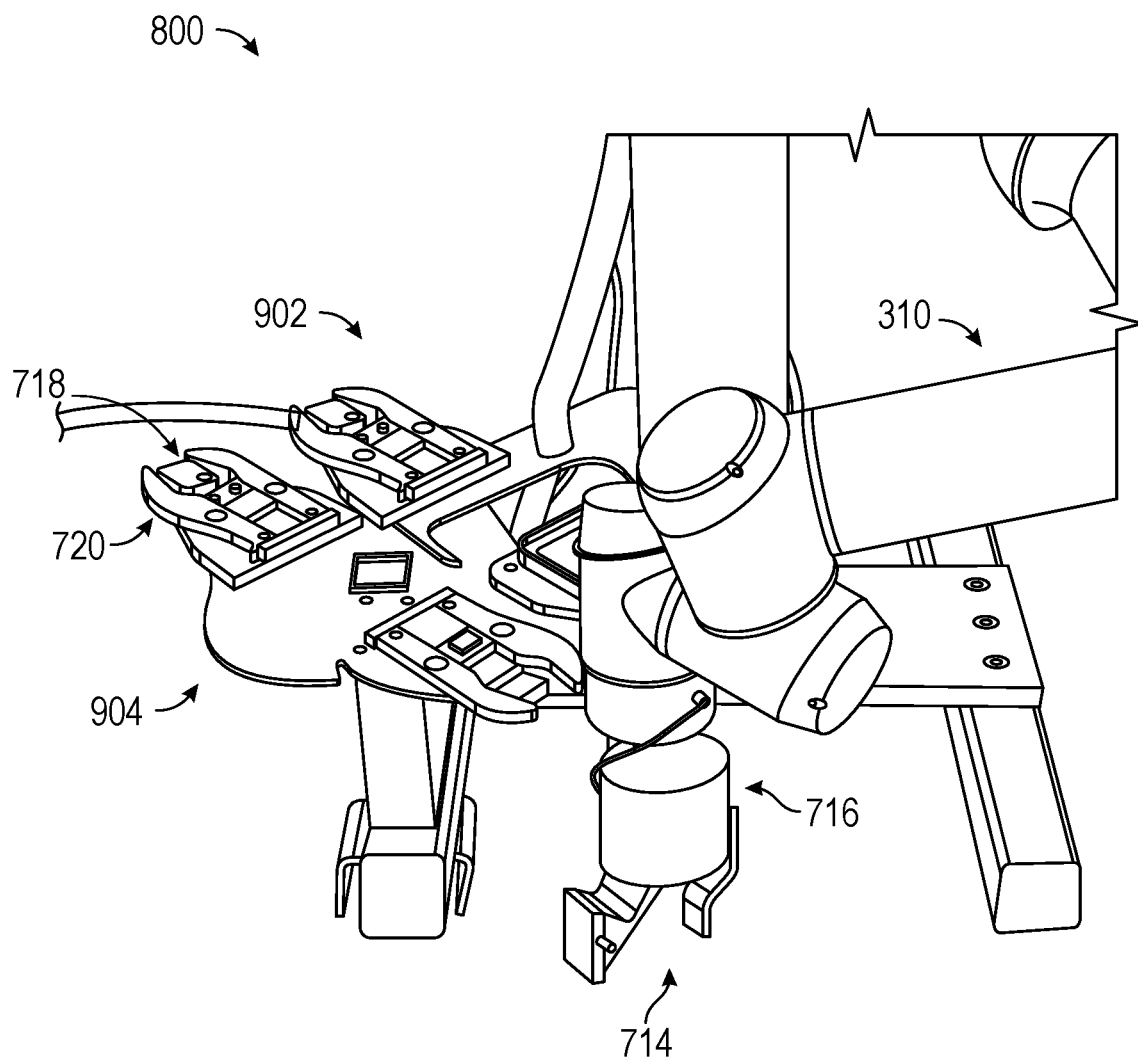
FIG. 9 depicts an embodiment of a tool holder carousel.

FIG. 8 and FIG. 9 depict automated tool changer systems 800. FIG. 8 depicts tool changer carousel 802 and changer adapters 804 attached to high-dexterity manipulators 310. Tool changer carousel 802 may provide a plurality of specialized tools 700 for immediate use. In some embodiments, operator 112 may select a tool by manipulating hand controls 114 and tool changer carousel 802 may rotate to provide the selected tool. In some embodiments, robot unit 302 may finish a first job and need a different tool for a second job. As such, a stored database of the tool locations may be accessed by computer-executable instructions to select the appropriate location for the tool, and tool changer carousel 802 may be actuated to the appropriate tool for the second job. In some embodiments, the tools may comprise near-field communication devices such as, for example, radio frequency identification, BLUETOOTH, and the like. As tool changer carousel 802 is attached to high-dexterity manipulators 310, the various tools may be attached prior to performing work based on the jobs to be performed. As such, operator 112 may attach the tools or the tool attachment may be automatic based on the jobs to be performed. Utilizing tool changer carousel 802 may provide the various tools to simply rotate the tools when few tools are needed to finish a job. Though three adapters 806 are shown, tool changer carousel 802 may be configured with more or fewer adapters 806.

FIG. 9 depicts an independent tool holder carousel 902 comprising clamp 720 and adapters. Tool holder carousel 902 may be positioned on carousel platform 904, which, in some embodiments, may be platform 314 or may be mounted on platform 314, or at any other location within reach of robot unit 302. The location of each tool may be stored in a database accessible by controller 214 as described above such that when a new tool is needed, tool holder carousel 902 may rotate to a position presenting the new tool to robot unit 302. Robot unit 302 may simply slide manipulator adapter 716 through clamp 720 coupling to tool adapter 718 coupling new tool to high-dexterity manipulators 310. Similarly, robot unit 302 may move high-dexterity manipulators 310 across in empty clamp 720 in the opposite direction to release a tool into clamp 720 on tool holder carousel 902. In some embodiments, other manipulator and tool adapters may be used. For example, pneumatically driven pins, twist lock/cams, spring-loaded pins, or any other type of automatic locking mechanism that may be used to lock a tool onto high-dexterity manipulators 310.

Figure 10:
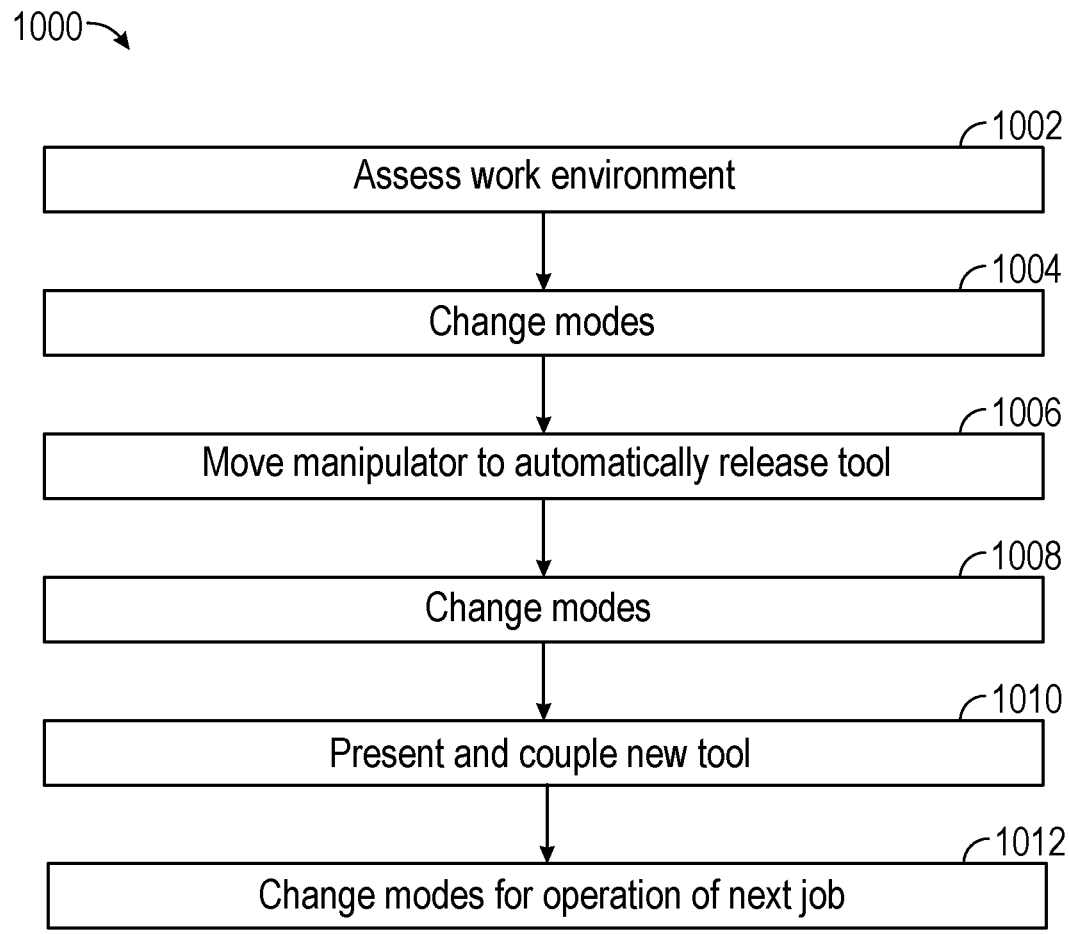
FIG. 10 depicts an exemplary process of changing tools.

FIG. 10 depicts an exemplary embodiment of a process tool changing process 1000 by robot unit 302. In some embodiments, operator 112 may initiate the tool change process, or the tool change process may be automatically initiated. In some embodiments, the entire tool change process may be automatic or controlled by operator 112. At step 1002, robot unit 302 assesses the work environment. Robot unit 302 may observe the work environment with camera system 118 and store data indicative of the work environment. Robot unit 302 then stores where any obstacles and where the work should be performed to run through an automated sequence in the work environment.

At step 1004, robot unit changes modes to a tool change mode. The mode change may be automatically or manually initiated. The mode change may be based on a completed job and a next job requires a different tool. Therefore, based on the sequence of stored jobs and actions to be performed, robot unit 302 may initiate the change modes to change tools.

At step 1004, a signal may be sent to tool changer carousel 802 to rotate tool changer carousel 802 to a position to use the appropriate tool. If tool changer carousel 802 is coupled to high-dexterity manipulator 304, once the rotation is performed and locked in place, robot unit 302 may change modes to work, and the process may continue. The location of the next tool to be used may be stored and associated with the next job to be performed. As such, robot unit 302 may automatically select the next tool. In some embodiments, operator 112, may select the next tool by viewing the tools coupled to tool changer carousel 802 and select a tool using hand controls 114. In some embodiments, operator 112 may select the tool from a list provided by head-up display in head-mounted display.

At step 1004, when robot unit 302 is not equipped with tool changer carousel 802, robot unit 302 may signal tool holder carousel 902 to rotate to provide robot unit 302 to a position of an open clamp 720. The clamp 720 may already be available as robot unit 302 may have previously procured the existing coupled tool from the clamp 720. Tool holder carousel 902 may comprise an optical, magnetic, position, or other sensor to detect if clamp contains a tool. Therefore, tool holder carousel may move clamp 720 to receive a tool from robot unit 302 based on stored instructions and the sensor detection.

Furthermore, at step 1004, the coordinate system of robot unit 302 may be updated based on the tool selection. The geometry of the tool changes when a new tool is selected, therefore the coordinate system and center of gravity may be updated based on the tool geometry. The coordinate system update may be part of the mode change for the new tool. In some embodiments, operator 112 may be prompted to select a coordinate system origin for smooth and comfortable operation. The user may select a coordinate system origin at the end of the tool, center of the tool, end of the manipulator arm, or anywhere else.

At step 1006, robot unit 302 may move high-dexterity manipulators 310 to release the existing tool into tool holder carousel 902 by moving a first direction that allows clamp 720 to clamp tool adapter 716 and triggers a releasing mechanism to release the existing tool into tool holder carousel 902. Existing tool may be released into clamp 720 and detected by the above-described clamp sensors. As such, tool holder carousel 902, may switch modes by executed instructions and rotate to the next tool for the next job stored in a database as in step 1008. In some embodiments, operator 112 may switch control from robot unit 302 to tool holder carousel 902, and control tool holder carousel 902 to rotate to a new tool by hand controls 114.

At step 1010, once tool holder carousel 902 is rotated to a new position presenting the new tool to robot unit 302. Robot unit 302 may move high-dexterity manipulators 310 in a second direction, opposite the first direction, where manipulator adapter 718 triggers a release mechanism on clamp 720 releasing new tool while tool adapter 716 attaches to manipulator adapter 716 coupling new tool to high-dexterity manipulators 310.

At step 1012, when the new tool is coupled to high-dexterity manipulators 310, robot unit 302 may change modes to perform the next job with the new tool. Coupling of the new tool to high-dexterity manipulators 310 may be detected by robot tool sensors such as optical, magnetic, position sensors and the like as described above.

Figure 11:
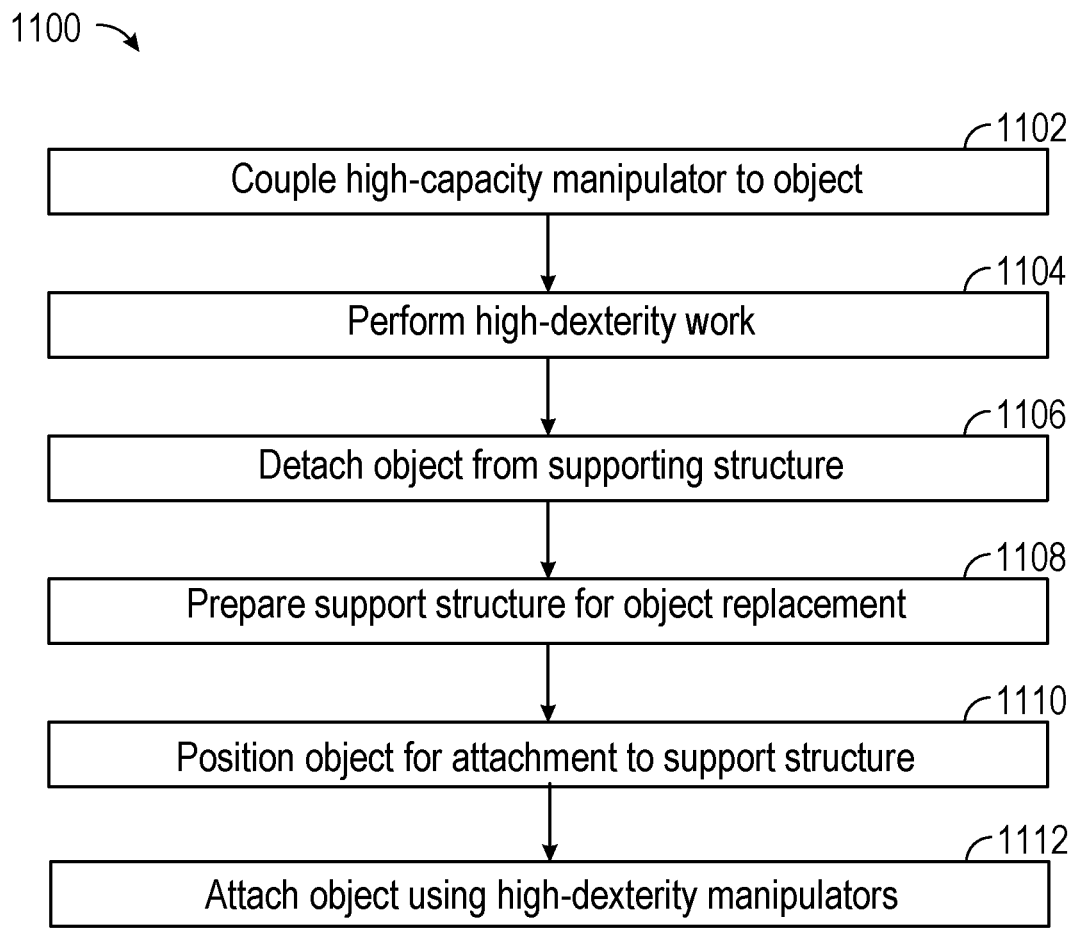
FIG. 11 depicts an exemplary process of the robot unit and the high-capacity manipulator working in cooperation.

FIG. 11 depicts an exemplary embodiment of a cooperation process 1100 of operation of robot unit 302 and high-capacity manipulator 304 in cooperation as described in embodiments above. The process described herein may be performed by operator 112, by computer-executable instructions executed by at least one processor (e.g., controller 214), or by a combination of both. In some embodiments, robot system 300 may perform the processes fully autonomously. It should be noted that the cooperative work performed between high-capacity manipulator 304 and robot unit 302 could be any type of work generally performed in the field of aerial work. The exemplary method here is not limiting and is meant to illustrate the cooperation between high-capacity manipulator 304 and robot unit 302. At step 1102, high-capacity manipulator 304 may couple to a heavy object (e.g., a transformer or a conductor) that is to be removed or replaced. High-capacity manipulator 304 may be controlled to grip the object and be locked in place to remain stationary while robot unit 302 detaches the object from any support members (e.g., cross member 614).

At step 1104, robot unit 302 may detach the object utilizing high-dexterity manipulators 310. High-dexterity manipulators 310 may be used to unscrew nuts and bolts, remove tie wire 406, and the like while high-capacity manipulator 304 secures the heavy object. Therefore, when the object is released from the support, the object is secured by high-capacity manipulator 304.

At step 1106, when the object is detached, high-capacity manipulator 304 may transport the object to the ground for maintenance by a ground crew or replacement with another object (e.g., replacement transformer, insulator, or a new cross arm). High-capacity manipulator 304 may take the object to the ground or secure the object suspended in the air. A control loop may be utilized to hold the object or high-capacity manipulator 304 may be locked in place while robot unit 302 performs work to prepare to replace the object at step 1108. In some embodiments, robot unit 302 may replace damaged parts or perform maintenance. For example, high-capacity manipulator 304 may lift a conductor while robot unit 302 replaces an insulator. In another example, a transformer may need to be replaced, and high-capacity manipulator 304 transports a damaged transformer to the ground and brings a replacement transformer to the work environment while robot unit 302 prepares the work environment by replacing fasteners and preparing fasteners to receive the replacement transformer.

At step 1110 the object is positioned for attachment. High-capacity manipulator 304 may position the object aligning the attachment holes with holes on the support structure (e.g., the utility pole or crossmember) for attachment of fasteners by high-dexterity manipulators 310 of robot unit 302. High-capacity manipulator 304 may hold the object in place by locking the object or providing a controller to hold the object relatively stationary given external forces such as wind and vibration from running motors and moving machines.

At step 1112, high-dexterity manipulators 310 may attach the object to the support structure by manipulating the fasteners. In some embodiments, the fasteners may be modified to provide for easier manipulation by robot unit 302 as described above in reference to FIG. 7.

Between each step may be a step of switching modes. For example, operator 112 may switch between operating robot unit 302 and operating high-capacity manipulator 304. Operator 112 may select a button or switch on hand controls 114. In some embodiments, a selection menu may be displayed by head-mounted display 116. Operator 112 may select various modes or machines to control by moving hand controls 114 in space to virtually select modes. Furthermore, any selections and controls may be voice controlled as described above.

Figure 12:
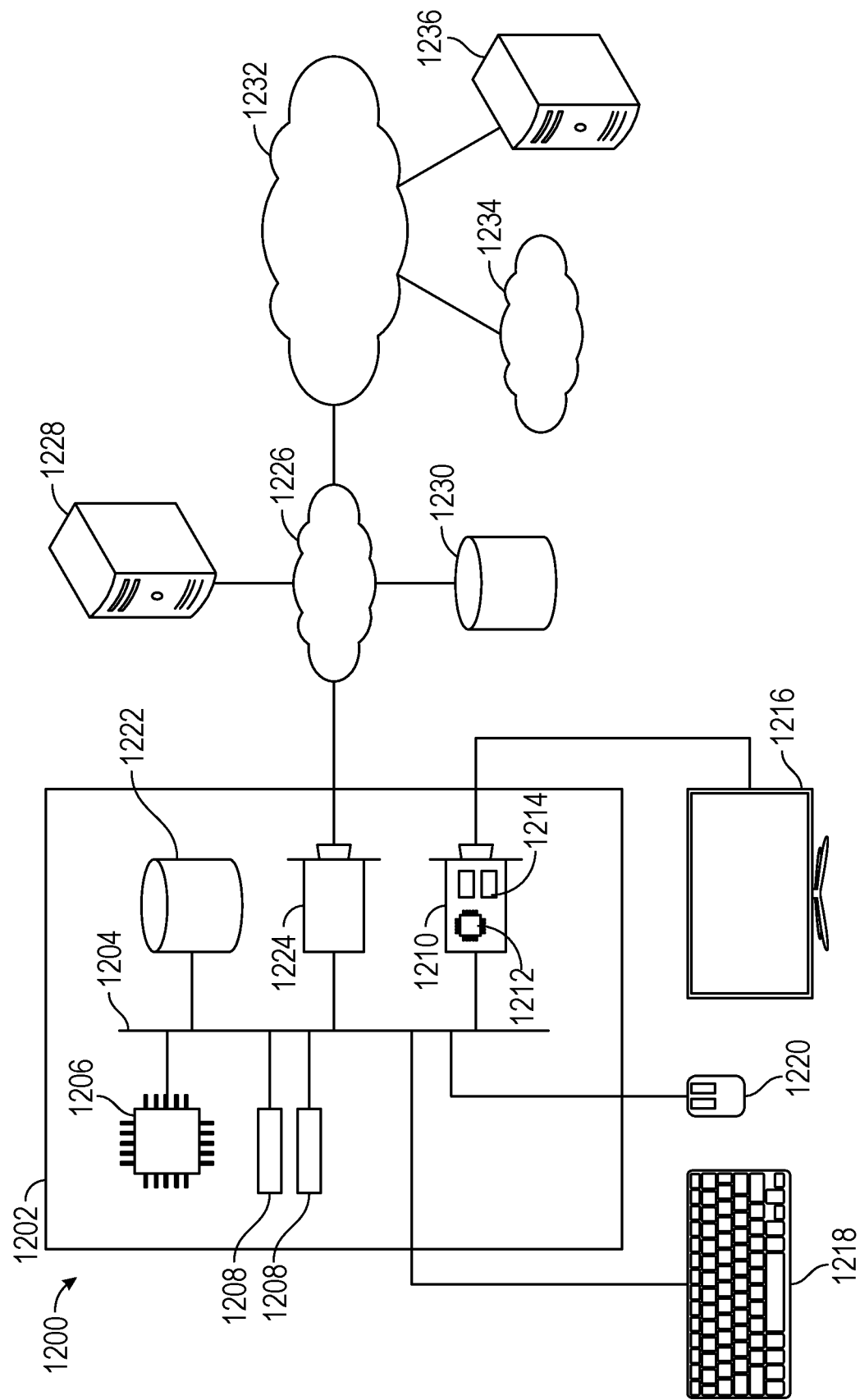
FIG. 12 depicts an exemplary hardware platform for embodiments of the disclosure.

In FIG. 12, an exemplary hardware platform for computer system 1200 for certain embodiments of the invention is depicted. Computer 1202 can be a desktop computer, a laptop computer, a server computer, a mobile device such as a smartphone or tablet, or any other form factor of general- or special-purpose computing device. Depicted with computer 1202 are several components, for illustrative purposes. In some embodiments, certain components may be arranged differently or absent. Additional components may also be present. Included in computer 1202 is system bus 1204, whereby other components of computer 1202 can communicate with each other. In certain embodiments, there may be multiple busses or components may communicate with each other directly. Connected to system bus 1204 is central processing unit (CPU) 1206. Also attached to system bus 1204 are one or more random-access memory (RAM) modules 1208. Also attached to system bus 1204 is graphics card 1210. In some embodiments, graphics card 1210 may not be a physically separate card, but rather may be integrated into the motherboard or the CPU 1206. In some embodiments, graphics card 1210 has a separate graphics-processing unit (GPU) 1212, which can be used for graphics processing or for general purpose computing (GPGPU). Also on graphics card 1210 is GPU memory 1214. Connected (directly or indirectly) to graphics card 1210 is display 1216 for user interaction. In some embodiments, no display is present, while in others it is integrated into computer 1202. Similarly, peripherals such as keyboard 1218 and mouse 1220 are connected to system bus 1204. Like display 1216, these peripherals may be integrated into computer 1202 or absent. Also connected to system bus 1204 is local storage 1222, which may be any form of computer-readable media and may be internally installed in computer 1202 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through the fiber-optic cable. Examples of stored information include computer-usable instructions, data structures, program modules, and other data representations.

Finally, network interface card (NIC) 1224 is also attached to system bus 1204 and allows computer 1202 to communicate over a network such as local network 1226. NIC 1224 can be any form of network interface known in the art, such as Ethernet, ATM, fiber, Bluetooth, or Wi-Fi (i.e., the IEEE 802.11 family of standards). NIC 1224 connects computer 1202 to local network 1226, which may also include one or more other computers, such as computer 1228, and network storage, such as data store 1230. Generally, a data store such as data store 1230 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 1228, accessible on a local network such as local network 1226, or remotely accessible over Internet 1232. Local network 1226 is in turn connected to Internet 1232, which connects many networks such as local network 1226, remote network 1234 or directly attached computers such as computer 1236. In some embodiments, computer 1202 can itself be directly connected to Internet 1232. It should be understood that, in some embodiments, computer 1202 may be the controller 214 described in reference to FIG. 2 and may perform similar operations.

The following U.S. patent applications, each filed Jul. 28, 2022, are each hereby incorporated by reference in their entirety as if set forth herein verbatim: U.S. Application Ser. No. 63/392,927, titled "REDUCING LATENCY IN HEAD-MOUNTED DISPLAY FOR THE REMOTE OPERATION OF MACHINERY"; U.S. application Ser. No. 17/875,674, titled "MANUAL OPERATION OF A REMOTE ROBOT ASSEMBLY"; U.S. application Ser. No. 17/875,710, titled "AUTONOMOUS AND SEMI-AUTONOMOUS CONTROL OF AERIAL ROBOTIC SYSTEMS"; U.S. application Ser. No. 17/875,796, titled "ROTARY TOOL FOR REMOTE POWER LINE OPERATIONS"; U.S. application Ser. No. 17/875,821, titled "OPERATION AND INSULATION TECHNIQUES"; U.S. application Ser. No. 17/875,893, titled "COORDINATE MAPPING FOR MOTION CONTROL"; U.S. application Ser. No. 17/875,943, titled "WIRE TENSIONING SYSTEM"; U.S. application Ser. No. 17/875,990, titled "CROSS-ARM PHASE-LIFTER"; and U.S. Application Ser. No. 63/393,047, titled "ELECTRICALLY INSULATING BLANKET WITH MEMORY SET". The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A system for performing cooperative aerial line work in an aerial work environment, the system comprising:
   a robot unit positioned on a platform comprising:
   a first plurality of sensors configured to detect a first state of the robot unit,
   wherein the first plurality of sensors comprises a camera disposed on a top of a frame via a camera mount,
   a first robot unit manipulator positioned on a first side of the frame at a first coupling point and configured to perform high-dexterity work;
   a second robot unit manipulator positioned on a second side of the frame at a second coupling point and configured to perform the high-dexterity work, wherein the second side of the frame is opposite the first side of the frame;

wherein the first robot unit manipulator and the second robot unit manipulator are configured to perform the cooperative aerial line work, and wherein the camera is coupled to the frame directly above a line connecting the first coupling point and the second coupling point;

at least one manipulator positioned on the platform proximate to the robot unit and configured to perform the cooperative aerial line work;

a second plurality of sensors disposed on the at least one manipulator and configured to detect a second state of the at least one manipulator;

a first controller providing feedback control to the robot unit;

a second controller providing feedback control to the at least one manipulator; and at least one processor configured to generate and send operational commands to the first controller and the second controller to complete the cooperative aerial line work by the robot unit and the at least one manipulator.

2. The system of claim 1, wherein the first plurality of sensors is configured to detect a geometry, a first load, and a first velocity of the robot unit, and wherein the second plurality of sensors is configured to detect a second geometry, a second load, and a second velocity of the at least one manipulator.

3. The system of claim 1, wherein the first robot unit manipulator and the second robot unit manipulator is configured to operate in at least six degrees of freedom.

4. The system of claim 1, wherein the at least one processor is disposed at a remote location separate from the robot unit.

5. The system of claim 1, wherein the operational commands comprise a first autonomously generated command and a second manually generated based on a manual input by a user.

6. The system of claim 1, wherein the at least one manipulator is hydraulically actuated and is dynamically monitored to statically hold a load while the robot unit performs high dexterity work.

7. The system of claim 1, wherein the camera is configured to collect images of the aerial work environment; and further comprising a head-mounted display configured to show the images in a real-time display of augmented reality.

8. The system of claim 1, further comprising a camera gimbal disposed on the frame and providing 360-degrees of rotation to the camera.

9. The system of claim 8, further comprising:

a headset comprising a plurality of headset sensors, wherein the plurality of headset sensors is configured to detect an orientation of a user's head, and wherein the camera gimbal is configured to move the camera based on the orientation of the user's head.

10. A system for performing cooperative aerial line work in an aerial work environment, the system comprising:

a robot unit disposed on a platform on a first boom tip of a first aerial device, the robot unit comprising:

a first plurality of sensors disposed on the robot unit configured to detect a first state of the robot unit;

wherein the first plurality of sensors comprises a camera disposed on a top of a frame;

a first robot unit manipulator positioned on a first side of the frame at a first coupling point and configured to perform high-dexterity work;

a second robot unit manipulator positioned on a second side of the frame at a second coupling point and configured to perform the high-dexterity work, wherein the second side of the frame is opposite the first side of the frame, wherein the camera is coupled to the frame directly above a line connecting the first coupling point and the second coupling point;

at least one manipulator proximate the robot unit and disposed on a second boom tip of a second aerial device;

a second plurality of sensors disposed on the at least one manipulator and configured to detect a second state of the at least one manipulator;

a first controller configured to control the robot unit based on the first state of the robot unit;

a second controller configured to control the at least one manipulator based on the second state of the at least one manipulator; and at least one processor configured to generate and send operational commands to the first controller and the second controller to complete the cooperative aerial line work.

11. The system of claim 10, wherein the operational commands are generated by the at least one processor based on a manual input from a user.

12. The system of claim 10, wherein the first robot unit manipulator and the second robot unit manipulator are operational in six degrees of freedom.

13. The system of claim 10, wherein the robot unit is a first robot unit, and wherein the at least one manipulator is disposed on a second robot unit and the at least one manipulator is operational in six degrees of freedom.

14. The system of claim 13, wherein the operational commands are autonomously generated based on the first state of the robot unit and the second state of the second robot unit.

15. The system of claim 10, wherein the at least one manipulator is a single hydraulically operated manipulator configured to lift a load of at least five hundred pounds.

16. The system of claim 15, wherein the operational commands are sent by a single manual operator of both the robot unit and the at least one manipulator.

17. A system for performing cooperative aerial line work in an aerial work environment, the system comprising:

at least one processor;

a robot unit comprising:

a robot unit communication device;

a frame;

a first robot unit manipulator positioned on a first side of the frame at a first coupling point and configured to perform high-dexterity work;

a second robot unit manipulator positioned on a second side of the frame at a second coupling point and configured to perform the high-dexterity work, wherein the second side of the frame is opposite the first side of the frame;

a first plurality of sensors configured to detect a state of the robot unit;

at least one camera coupled to the frame directly above a line connecting the first coupling point and the second coupling point;

one or more communication devices for communicating with the robot unit communication device and a manipulator communication device; and one or more non-transitory computer-readable media storing computer-executable instructions that, when executed by the at least one processor, perform a method of commanding the robot unit and at least one manipulator to perform the cooperative aerial line work in the aerial work environment, the method comprising:

obtaining, from the first plurality of sensors, a first state of the robot unit;

obtaining, from a second plurality of sensors, a second state of the at least one manipulator;

obtaining, from the at least one camera, images of a third state of the aerial work environment;

receiving at least one input from a user; and determining at least one algorithm to complete the cooperative aerial line work based on the first state, the second state, the third state, and the at least one input from the user.

18. The system of claim 17, wherein the at least one algorithm comprises instructions for controlling both the robot unit and the at least one manipulator.

19. The system of claim 17, further comprising:

a headset configured for displaying the images of the third state of the aerial work environment in an augmented reality to the user; and hand controls operable for receiving the at least one input from the user.

20. The system of claim 17, wherein the at least one input from the user is a selection of a task to be performed and the determining of the at least one algorithm and the task are completed autonomously.

* * * * *